US012622475B2

(12) United States Patent
Janes et al.

(10) Patent No.: US 12,622,475 B2
(45) Date of Patent: May 12, 2026

(54) METHODS, SYSTEMS, AND ARTICLES FOR PRODUCING A FILM PATTERN ON A SUBSTRATE MATERIAL

(71) Applicant: NIKE, Inc., Beaverton, OR (US)

(72) Inventors: Cody Evin Janes, Beaverton, OR (US); Daniel P. Morgan, Beaverton, OR (US); Kyle Schepke, Portland, OR (US); Joshua Patrick Williams, Portland, OR (US); Yang-Hua Ou, Miaoli (TW)

(73) Assignee: NIKE, Inc., Beaverton, OR (US)

( * ) Notice: Subject to any disclaimer, the term of this patent is extended or adjusted under 35 U.S.C. 154(b) by 539 days.

(21) Appl. No.: 17/634,086

(22) PCT Filed: Aug. 12, 2020

(86) PCT No.: PCT/CN2020/108643
§ 371 (c)(1),
(2) Date: Feb. 9, 2022

(87) PCT Pub. No.: WO2021/027837
PCT Pub. Date: Feb. 18, 2021

(65) Prior Publication Data
US 2022/0347717 A1     Nov. 3, 2022

Related U.S. Application Data

(60) Provisional application No. 62/972,426, filed on Feb. 10, 2020, provisional application No. 62/951,154, (Continued)

(51) Int. Cl.
*A41D 27/28*          (2006.01)
*A41D 13/015*         (2006.01)
(Continued)

(52) U.S. Cl.
CPC ......... *A41D 27/28* (2013.01); *A41D 13/0156* (2013.01); *A41D 31/02* (2013.01); (Continued)

(58) Field of Classification Search
CPC ...... A41D 1/08; A41D 1/089; A41D 13/0015; A41D 13/0156; A41D 27/28; (Continued)

(56) References Cited

U.S. PATENT DOCUMENTS 2,655,693 A     10/1953   Adams
3,300,557 A      1/1967   Luciano
(Continued)

FOREIGN PATENT DOCUMENTS

CN          2521924 Y      11/2002
CN          102613730       8/2012
(Continued)

OTHER PUBLICATIONS

Material Properties—"Polyamide—Nylon—Density—Strength—Melting Point—Thermal Conductivity" Webpage found at <https://material-properties.org/polyamide-nylon-density-strength-melting-point-thermal-conductivity/> Not Prior Art. (Year: 2024).*
(Continued)

*Primary Examiner* — Alex B Efta
*Assistant Examiner* — Alexander S Wright
(74) *Attorney, Agent, or Firm* — Shook, Hardy & Bacon L.L.P.

(57) ABSTRACT

Aspects herein are directed to systems, methods, and articles for producing a patterned film and using the patterned film to form a pattern of discrete overlay film structures on a substrate material. A uniform thickness of a film material is deposited on to a first surface of a run of carrier sheets, where each carrier sheet includes one or more holes extending there through. A first carrier sheet is extracted from the
(Continued)

run of carrier sheets, and a second surface of the carrier sheet is positioned on a substrate material. Heat and/or pressure is applied to the film material to cause the film material to transfer to the substrate material through the one or more holes in the carrier sheet forming a pattern of discrete overlay film structures on the substrate material. The carrier sheet along with remaining portions of the film material is removed from the substrate material.

14 Claims, 11 Drawing Sheets

Related U.S. Application Data filed on Dec. 20, 2019, provisional application No. 62/924,527, filed on Oct. 22, 2019, provisional application No. 62/885,589, filed on Aug. 12, 2019.

(51) Int. Cl.

| | |
|---|---|
| *A41D 31/02* | (2019.01) |
| *A41D 31/12* | (2019.01) |
| *A41D 31/18* | (2019.01) |
| *B05C 5/02* | (2006.01) |
| *B05C 11/00* | (2006.01) |
| *B05D 1/26* | (2006.01) |
| *B05D 1/28* | (2006.01) |
| *B05D 7/14* | (2006.01) |
| *B32B 3/08* | (2006.01) |
| *B32B 3/26* | (2006.01) |
| *B32B 5/26* | (2006.01) |
| *B32B 7/05* | (2019.01) |
| *B32B 37/00* | (2006.01) |
| *D06B 1/02* | (2006.01) |

(52) U.S. Cl.
CPC ......... *A41D 31/125* (2019.02); *A41D 31/185* (2019.02); *B05C 5/0208* (2013.01); *B05C 11/00* (2013.01); *B05D 1/265* (2013.01); *B05D 1/286* (2013.01); *B05D 7/14* (2013.01); *B32B 3/085* (2013.01); *B32B 5/26* (2013.01); *B32B 7/05* (2019.01); *B32B 37/0076* (2013.01); *D06B 1/02* (2013.01); *B32B 3/266* (2013.01); *B32B 2274/00* (2013.01); *B32B 2305/18* (2013.01); *B32B 2307/728* (2013.01); *B32B 2307/734* (2013.01); *Y10T 442/162* (2015.04); *Y10T 442/3854* (2015.04); *Y10T 442/40* (2015.04)

(58) Field of Classification Search
CPC .... A41D 27/285; A41D 31/02; A41D 31/125; A41D 31/185; A41D 2500/52; B05C 5/0208; B05C 11/00; B05D 1/265; B05D 1/286; B05D 7/14; B32B 3/085; B32B 3/266; B32B 5/26; B32B 7/05; B32B 37/0076; B32B 2274/00; B32B 2305/18; B32B 2307/728; B32B 2307/734; D06B 1/02; D06M 15/507; D06M 15/693; D06M 23/14; D06M 23/16; Y10T 442/162; Y10T 442/3854; Y10T 442/40
See application file for complete search history.

(56) References Cited

U.S. PATENT DOCUMENTS

| | | | |
|---|---|---|---|
| 3,417,175 A | 12/1968 | Brown et al. | |
| 3,439,083 A | 4/1969 | Ugolini | |
| 3,791,906 A | 2/1974 | Farkas | |
| 4,415,623 A | 11/1983 | Schlaepfer | |
| 4,655,868 A | 4/1987 | Hefele | |
| 4,880,588 A | 11/1989 | Brault et al. | |
| 4,944,979 A * | 7/1990 | Gagliano | H05K 13/0084 206/824 |
| 5,498,307 A | 3/1996 | Stevenson | |
| 5,773,080 A * | 6/1998 | Simmons | B05D 5/10 427/420 |
| 5,937,272 A | 8/1999 | Tang | |
| 6,194,119 B1 | 2/2001 | Wolk et al. | |
| 6,296,732 B1 | 10/2001 | Enlow et al. | |
| 6,733,870 B2 | 5/2004 | Enlow et al. | |
| 6,767,807 B2 | 7/2004 | Shibata et al. | |
| 6,773,537 B2 | 8/2004 | Erickson et al. | |
| 6,809,045 B1 | 10/2004 | Alam et al. | |
| 8,039,373 B2 | 10/2011 | Fujinawa et al. | |
| 8,574,668 B2 | 11/2013 | Brown et al. | |
| 8,956,685 B2 * | 2/2015 | Bogue | A61K 9/7007 264/212 |
| 9,732,454 B2 | 8/2017 | Davis et al. | |
| 10,170,341 B1 | 1/2019 | Lin et al. | |
| 2004/0209057 A1 * | 10/2004 | Enlow | B32B 27/304 428/220 |
| 2005/0252602 A1 | 11/2005 | Tateishi | |
| 2006/0154546 A1 * | 7/2006 | Murphy | A61F 13/023 428/317.1 |
| 2006/0260024 A1 | 11/2006 | Lee | |
| 2007/0016999 A1 | 1/2007 | Harber et al. | |
| 2007/0026265 A1 | 2/2007 | Sakurai et al. | |
| 2007/0042660 A1 | 2/2007 | Waxler | |
| 2007/0161305 A1 | 7/2007 | Wangbunyen | |
| 2007/0270067 A1 | 11/2007 | Yasui et al. | |
| 2007/0293106 A1 | 12/2007 | Harber | |
| 2008/0057809 A1 | 3/2008 | Rock | |
| 2008/0075850 A1 | 3/2008 | Rock | |
| 2008/0104738 A1 | 5/2008 | Conley et al. | |
| 2008/0254263 A1 | 10/2008 | Yasui et al. | |
| 2009/0276936 A1 | 11/2009 | Makida et al. | |
| 2011/0296580 A1 | 12/2011 | Demarest et al. | |
| 2012/0282403 A1 | 11/2012 | Ray et al. | |
| 2014/0000004 A1 | 1/2014 | Baron et al. | |
| 2014/0082815 A1 | 3/2014 | Harber et al. | |
| 2015/0246327 A1 | 9/2015 | Nichols et al. | |
| 2016/0242474 A1 | 8/2016 | Baschak et al. | |
| 2016/0338415 A1 | 11/2016 | Aihara | |
| 2016/0338435 A1 | 11/2016 | Aihara | |
| 2016/0340826 A1 | 11/2016 | Tibbits et al. | |
| 2017/0071275 A1 | 3/2017 | Darby | |
| 2017/0105466 A1 | 4/2017 | Baschak et al. | |
| 2017/0144344 A1 | 5/2017 | Schmidt et al. | |
| 2017/0273377 A1 | 9/2017 | Aihara et al. | |
| 2017/0340037 A1 | 11/2017 | Bailey et al. | |
| 2018/0049698 A1 * | 2/2018 | Berg | A41D 1/005 |
| 2018/0142389 A1 | 5/2018 | Diaz et al. | |
| 2018/0192720 A1 | 7/2018 | Blackford et al. | |
| 2018/0194106 A1 | 7/2018 | Tibbits et al. | |
| 2018/0195213 A1 | 7/2018 | Tibbits et al. | |
| 2018/0195216 A1 | 7/2018 | Lin | |
| 2018/0319134 A1 * | 11/2018 | Abbondanzio | B32B 21/08 |
| 2020/0131695 A1 | 4/2020 | Lao et al. | |
| 2020/0164610 A1 * | 5/2020 | Davis | B32B 27/32 |
| 2020/0215786 A1 | 7/2020 | Dorton et al. | |
| 2021/0045474 A1 | 2/2021 | Koshkaroff et al. | |
| 2021/0045476 A1 | 2/2021 | Morgan et al. | |
| 2021/0045477 A1 | 2/2021 | Morgan et al. | |
| 2022/0030992 A1 | 2/2022 | Koshkaroff et al. | |
| 2023/0157392 A1 | 5/2023 | Koshkaroff et al. | |

FOREIGN PATENT DOCUMENTS

| | | |
|---|---|---|
| CN | 102613730 A | 8/2012 |
| CN | 103519427 | 1/2014 |
| CN | 103519427 A | 1/2014 |
| CN | 104859270 A | 8/2015 |
| CN | 106029234 A | 10/2016 |
| CN | 107750130 A | 3/2018 |
| CN | 108471823 | 8/2018 |
| CN | 108471823 A | 8/2018 |

(56) References Cited

FOREIGN PATENT DOCUMENTS

| | | | |
|---|---|---|---|
| CN | 109121386 | A | 1/2019 |
| EP | 0360929 | A1 | 4/1990 |
| EP | 0789543 | B1 | 6/2002 |
| EP | 2411210 | B1 | 7/2016 |
| EP | 3449743 | A1 | 3/2019 |
| FR | 2856708 | A1 | 12/2004 |
| GB | 2184399 | B | 2/1990 |
| JP | 60-072800 | A | 4/1985 |
| JP | 2000-195665 | A | 7/2000 |
| JP | 2002-338908 | A | 11/2002 |
| JP | 2002338908 | | 11/2002 |
| JP | 2003-322715 | A | 11/2003 |
| KR | 10-2009-0102426 | A | 9/2009 |
| TW | 201225160 | A | 6/2012 |
| WO | 2009/041916 | A1 | 4/2009 |
| WO | 2019/155348 | A1 | 8/2019 |
| WO | 2019/169079 | A1 | 9/2019 |
| WO | 2021/027837 | A1 | 2/2021 |
| WO | 2021/096724 | A1 | 5/2021 |

OTHER PUBLICATIONS

Lee Products Company, "New Sortkwik Fingertip Moistener", YouTube Vide dated Mar. 6, 2025. Accessed at <https://www.youtube.com/watch?v=rb6ynWoovS0> (Year: 2015).*

Seo Ho Lee, Ryong You, Young Il Yoon, and Won Ho Park. "Preparation and characterization of acrylic pressure-sensitive adhesives based on UV and heat curing systems". International Journal of Adhesion and Adhesives 75 (2017) 190-195. Noted as being Available online since Mar. 10, 2017. (Year: 2017).*

International Preliminary Report on Patentability received for PCT Patent Application No. PCT/US2020/045753, dated Feb. 24, 2022, 9 pages.

Notice of Allowance received for U.S. Appl. No. 17/505,198, mailed on Aug. 14, 2024. 9 pages.

Office Action received for European Application No. 20852126.0, mailed on Jul. 22, 2024, 5 pages.

Non-Final Office Action received for U.S. Appl. No. 16/988,110, mailed on Jun. 7, 2023, 19 pages.

Non-Final Office Action received for U.S. Appl. No. 18/100,362, mailed on May 24, 2023, 12 pages.

Final Office Action received for U.S. Appl. No. 16/988,110, mailed on Feb. 17, 2023, 17 pages.

Final Office Action received for U.S. Appl. No. 16/988,116, mailed on Jan. 19, 2023, 9 pages.

International Preliminary Report on Patentability received for PCT Patent Application No. PCT/CN2020/108643, mailed on Feb. 24, 2022, 5 pages.

International Preliminary Report on Patentability received for PCT Patent Application No. PCT/US2020/045753, mailed on Feb. 24, 2022, 9 pages.

International Preliminary Report on Patentability received for PCT Patent Application No. PCT/US2020/045755, mailed on Feb. 24, 2022, 8 pages.

International Preliminary Report on Patentability received for PCT Patent Application No. PCT/US2020/045756, mailed on Feb. 24, 2022, 9 pages.

Non-Final Office Action received for U.S. Appl. No. 16/988,093, mailed on Mar. 22, 2022, 8 pages.

Non-Final Office Action received for U.S. Appl. No. 17/505,198, mailed on Apr. 22, 2024, 18 pages.

Notice of Allowance received for U.S. Appl. No. 18/100,362, mailed on Apr. 4, 2024, 8 pages.

International Search Report and Written Opinion received for PCT Patent Application No. PCT/US2022/046742, mailed on Jan. 26, 2023, 13 pages.

Final office action received for U.S. Appl. No. 18/100,362, mailed on Dec. 13, 2023, 7 pages.

Intention to Grant received for European Application No. 20761444.7, mailed on Dec. 15, 2023, 6 pages.

Office Action received for European Application No. 20761445.4, mailed on Dec. 14, 2023, 6 pages.

Office Action received for European Application No. 20761936.2, mailed on Dec. 13, 2023, 4 pages.

Extended European Search Report received for European Patent Application No. 20852126.0, mailed on Sep. 8, 2023, 9 pages.

Final Office Action received for U.S. Appl. No. 16/988,110, mailed on Sep. 21, 2023, 16 pages.

Non-Final Office Action received for U.S. Appl. No. 16/988,116, mailed on Sep. 27, 2023, 9 pages.

Non-Final Office Action received for U.S. Appl. No. 16/988,116, mailed on Sep. 14, 2022, 9 pages.

Notice of Allowance received for U.S. Appl. No. 16/988,093, mailed on Sep. 21, 2022, 8 pages.

International Search Report issued in PCT/CN2020/108643, issued Nov. 18, 2020, 3 pages.

Non- Final Office Action received for U.S. Appl. No. 16/988,110, mailed on Apr. 11, 2022, 10 pages.

Production Processes, 8 pages.

Hardy, Norm, "What is Patterned Thin Film Deposition for Lift Off?", Semicore, Available online at: <http://www.semicore.com/news/73-thin-film-deposition-lift-off>, Sep. 16, 2013, 2 pages.

Yang, Lei, "Patterning Technique", ScienceDirect, Available online at: <https://www.sciencedirect.com/topics/engineering/patterning-method>, 2015, 22 pages.

Final Office Action received for U.S. Appl. No. 16/988,116, mailed on Jun. 24, 2024, 9 pages.

Notice of Allowance received for U.S. Appl. No. 18/100,362, mailed on Jun. 20, 2024, 2 pages.

Notice of Allowance received for U.S. Appl. No. 16/988,116, mailed on Mar. 3, 2025, 9 pages.

Extended European Search Report received for European Application No. 24177068.4, mailed on Oct. 18, 2024, 8 pages.

Notice of Allowance received for U.S. Appl. No. 17/505,198, mailed on Nov. 20, 2024, 4 pages.

Notice of Allowance received for U.S. Appl. No. 16/988,110, mailed on Oct. 23, 2025, 8 pages.

Extended European Search Report received for European Patent Application No. 25192185.4, mailed on Oct. 16, 2025, 8 pages.

Notice of Allowance received for Canadian Patent Application No. 3,229,371, mailed on Dec. 1, 2025, 1 page.

* cited by examiner

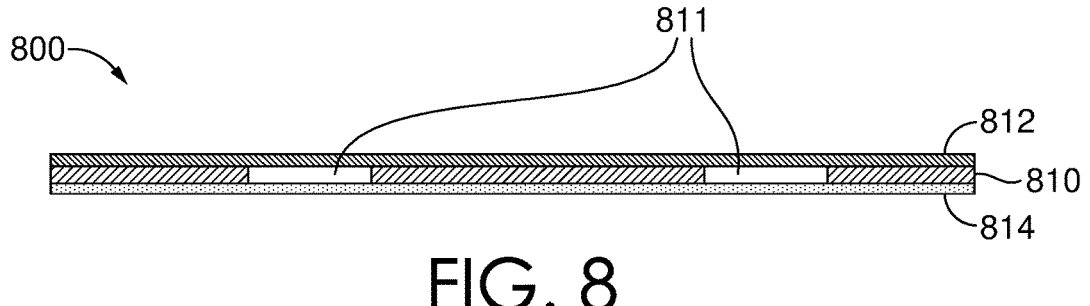

| 910 | CONTINUOUSLY EXTRUDE A UNIFORM THICKNESS OF A FILM MATERIAL ON TO A FIRST SURFACE OF A RUN OF CARRIER SHEETS WHERE EACH CARRIER SHEET HAS HOLES EXTENDING THERE THROUGH |

| 912 | EXTRACT A FIRST CARRIER SHEET FROM THE RUN OF CARRIER SHEETS |

| 914 | APPLY A SECOND SURFACE OF THE FIRST CARRIER SHEET TO A SUBSTRATE MATERIAL |

| 916 | APPLY HEAT AND/OR PRESSURE TO THE FIRST CARRIER SHEET TO CAUSE THE FILM MATERIAL TO TRANSFER TO THE SUBSTRATE MATERIAL AT AREAS CORRESPONDING TO THE HOLES IN THE FIRST CARRIER SHEET |

| 918 | REMOVE THE FIRST CARRIER SHEET FROM THE SUBSTRATE MATERIAL |

FIG. 9

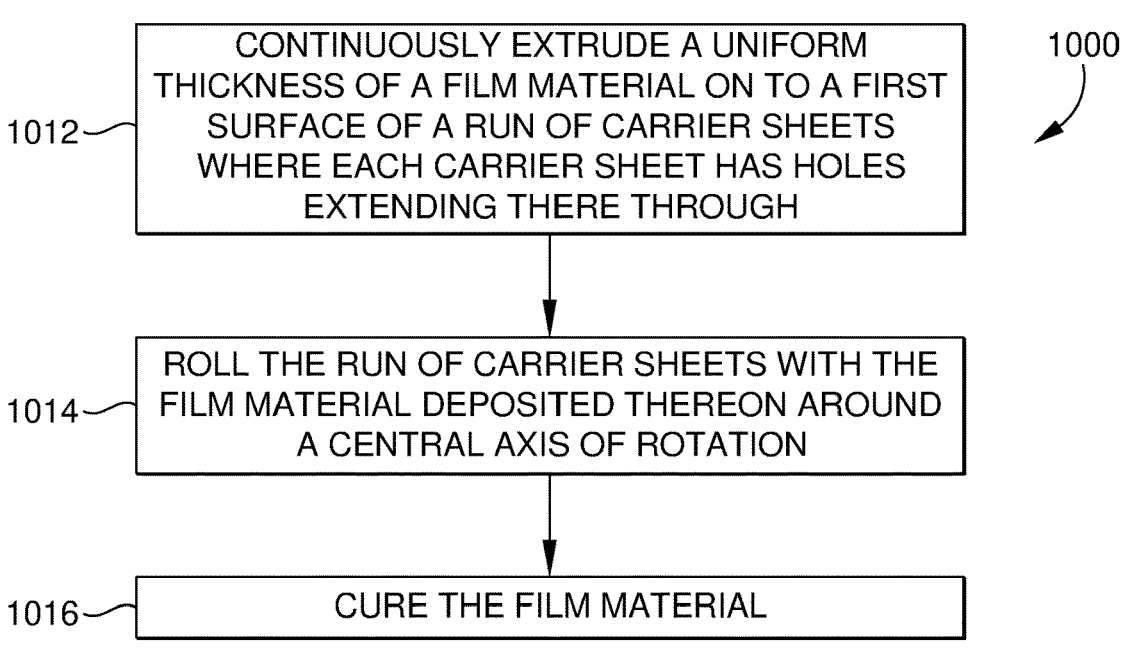

1012 — CONTINUOUSLY EXTRUDE A UNIFORM THICKNESS OF A FILM MATERIAL ON TO A FIRST SURFACE OF A RUN OF CARRIER SHEETS WHERE EACH CARRIER SHEET HAS HOLES EXTENDING THERE THROUGH

1000

1014 — ROLL THE RUN OF CARRIER SHEETS WITH THE FILM MATERIAL DEPOSITED THEREON AROUND A CENTRAL AXIS OF ROTATION

1016 — CURE THE FILM MATERIAL

FIG. 10

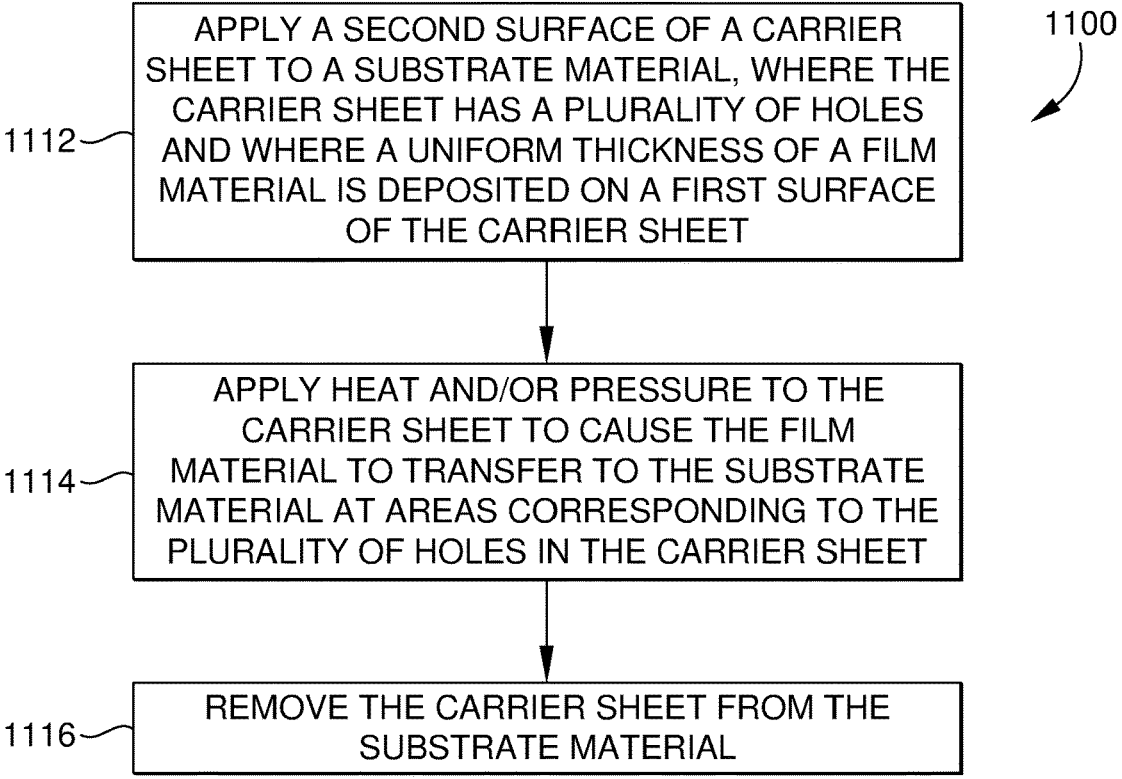

1112 — APPLY A SECOND SURFACE OF A CARRIER SHEET TO A SUBSTRATE MATERIAL, WHERE THE CARRIER SHEET HAS A PLURALITY OF HOLES AND WHERE A UNIFORM THICKNESS OF A FILM MATERIAL IS DEPOSITED ON A FIRST SURFACE OF THE CARRIER SHEET

1100

1114 — APPLY HEAT AND/OR PRESSURE TO THE CARRIER SHEET TO CAUSE THE FILM MATERIAL TO TRANSFER TO THE SUBSTRATE MATERIAL AT AREAS CORRESPONDING TO THE PLURALITY OF HOLES IN THE CARRIER SHEET

1116 — REMOVE THE CARRIER SHEET FROM THE SUBSTRATE MATERIAL

METHODS, SYSTEMS, AND ARTICLES FOR PRODUCING A FILM PATTERN ON A SUBSTRATE MATERIAL

CROSS-REFERENCE TO RELATED APPLICATIONS AND PRIORITY CLAIM

This Application is a 35 U.S.C. 371 application of PCT Application No. PCT/CN2020/108643, filed Aug. 12, 2020, and titled, "Methods, Systems, and Articles for Producing a Film Pattern on a Substrate Material," which claims the benefit of priority of U.S. Provisional App. No. 62/885,589, filed Aug. 12, 2019, and entitled "Apparel with Adaptive Fit," U.S. Provisional App. No. 62/924,527, filed Oct. 22, 2019, and entitled "Apparel with Dynamic Vent Structure," U.S. Provisional App. No. 62/951,154, filed Dec. 20, 2019, and entitled "Methods, Systems, and Articles for Producing a Film Pattern on a Substrate Material," and U.S. Provisional App. No. 62/972,426, filed Feb. 10, 2020, and entitled "Apparel with Cling Reduction Features." The entireties of the aforementioned applications are incorporated by reference herein.

TECHNICAL FIELD

Aspects herein are directed to methods, systems, and articles for forming a patterned film material and applying the patterned film material to a substrate material to produce a film pattern on the substrate material.

BACKGROUND

Application of a film pattern having a plurality of discrete film structures to a substrate material is typically a labor intensive process that is not scalable to meet production needs. In one example, the discrete film structures are generated by, for example, cutting a film material, and the discrete film structures are applied to a substrate material.

BRIEF DESCRIPTION OF THE DRAWINGS

Examples of aspects herein are described in detail below with reference to the attached drawing figures, wherein:

FIG. 8 illustrates an example carrier sheet with a film material deposited on a first surface of the carrier sheet and an adhesive layer on a second surface of the carrier sheet in accordance with aspects herein;

FIG. 9 illustrates a flow diagram of an example method of producing a patterned film and generating a pattern of discrete overlay film structures on a substrate material using the patterned film in accordance with aspects herein;

FIG. 10 illustrates a flow diagram of an example method of producing a patterned film in accordance with aspects herein;

FIG. 11 illustrates a flow diagram of an example method of generating a pattern of discrete overlay film structures on a substrate material in accordance with aspects herein;

DETAILED DESCRIPTION

Figure 1:
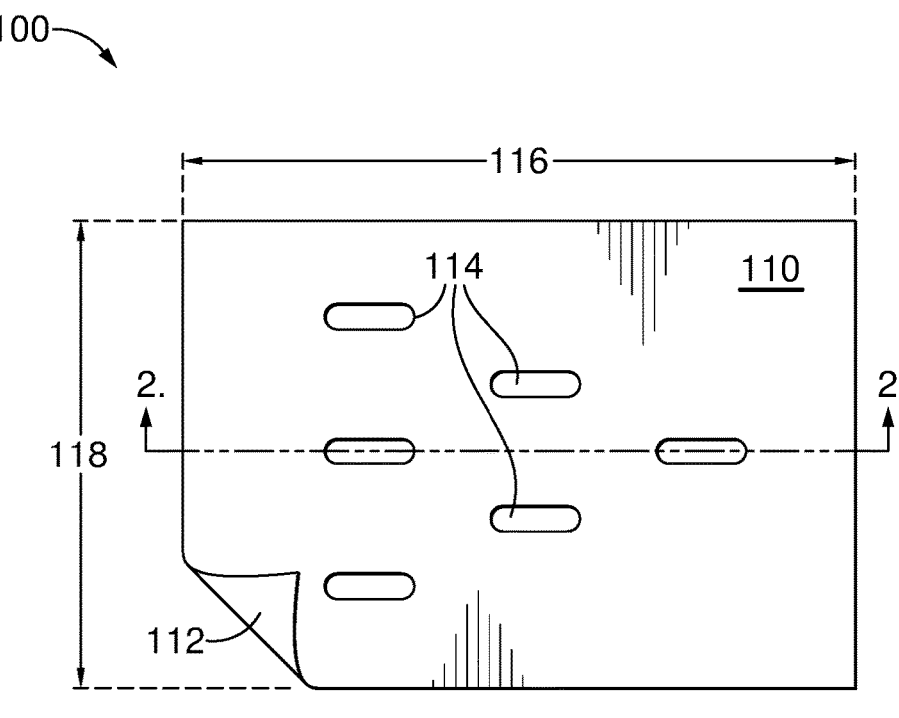
FIG. 1 illustrates an example carrier sheet having a plurality of holes extending there through in accordance with aspects herein.

The subject matter of the present invention is described with specificity herein to meet statutory requirements. However, the description itself is not intended to limit the scope of this disclosure. Rather, the inventors have contemplated that the claimed or disclosed subject matter might also be embodied in other ways, to include different steps or combinations of steps similar to the ones described in this document, in conjunction with other present or future technologies. Moreover, although the terms "step" and/or "block" might be used herein to connote different elements of methods employed, the terms should not be interpreted as implying any particular order among or between various steps herein disclosed unless and except when the order of individual steps is explicitly stated.

Application of a pattern of discrete overlay film structures to a substrate material has traditionally been a labor intensive process that is generally not scalable to meet large production needs. In one example, the discrete film structures are generated by, for example, cutting a film material, and the discrete film structures are applied to a substrate material in a desired pattern. Aspects herein are directed to a scalable method of producing a patterned film and forming a pattern of discrete overlay film structures on a substrate material using the patterned film. The patterned film is produced by extruding a uniform thickness of a film material on to a run of carrier sheets having a plurality of holes extending there through. The run of carrier sheets with the film material deposited thereon may be rolled to form a rolled good which can be stored and used as needed. The run of carrier sheets with the film material deposited thereon may be subdivided into a plurality of individual carrier sheets where each carrier sheet includes a first surface with the film material deposited thereon and a second opposite surface. The second surface of a respective carrier sheet may be applied to a substrate material in the form of, for example, a pattern piece for an article of apparel or a continuous rolled good, and heat and/or pressure, and/or other types of energy are applied to the carrier sheet to cause the film material to transfer to the substrate material at areas corresponding to the holes in the carrier sheet thus producing a pattern of discrete overlay film structures on the substrate material that matches the pattern of holes in the carrier sheet. The carrier sheet may then be removed which removes portions of the film material that are located at the "non-hole" portions of the carrier sheet (i.e., the negative of the pattern of discrete overlay film structures). The process thus described is suitable for large-scale production needs.

Aspects herein are further directed to additional articles and methods for applying a film material to a substrate material. For example, aspects herein contemplate a jig that allows for registration of a substrate material to produce a consistent patterning of the film structures on the substrate materials. Aspects herein further contemplate a transfer device that utilizes transfer points that can be heated to point transfer a film material to a substrate material to produce a pattern of discrete overlay film structures. The use of the transfer device may obviate the need for a carrier sheet in example aspects. Aspects herein include methods for imparting a surface texture to the discrete overlay film structures during the transfer process through use of, for example, a textured release paper. An additional method contemplated herein is directed toward maximizing the utilization of a film material by repositioning the film material on a carrier sheet after an initial use such that the non-transferred areas of the film material are positioned overtop the holes in the carrier sheet, positioning the carrier sheet on a substrate material, and using heat and/or pressure to transfer the film material through the holes in the carrier sheet and on to the substrate material to produce a pattern of discrete overlay film structures.

As used herein the term "substrate material" generally means a material suitable for forming an article of apparel such as an upper-body garment, a lower-body garment, a whole-body garment, a sock, a shoe, a glove, an article of headwear, and the like. Thus, in example aspects, the substrate material may include a knit material, a woven material, a non-woven material, and the like. In one example, the knit material and/or woven material may be formed of yarns having a low moisture regain where moisture regain is defined as the percentage of moisture an oven-dry fiber or filament will absorb from the air when at standard temperature and relative humidity. As explained further below, it is contemplated herein that the film material when applied to the substrate material may cause a deformation or puckering of the substrate material when the film material is exposed to moisture; the puckering or deformation provides functional benefits in example aspects. For instance, the puckering or deformation may change a level of fit of the article of apparel, it may produce stand-off structures that, when positioned on an inner-facing surface of an article, may reduce cling and promote cooling, and/or the puckering or deformation may be used to tension a vent opening in the substrate material from a closed state to an open state to increase an overall permeability and breathability of the article of apparel. The degree of puckering or deformation may be enhanced when the substrate material is formed of yarns having a low moisture regain as these yarns will absorb less moisture and thus will not counteract the deformation forces of the film material. In further example aspects, the substrate material may include a lightweight textile fabric (e.g., from about 30 grams per square meter (gsm) to about 150 gsm) or an ultra-lightweight fabric (e.g., from about 10 gsm to about 100 gsm) although heavier weight textiles are contemplated herein. Lightweight and ultra-lightweight textiles may pucker or deform to a greater degree when the film material is exposed to moisture as opposed to heavier weight textiles.

As used herein, the term "film material" may include a thermoplastic polyester elastomer (TPEE) film material, and more specifically a poly-butylene terephthalate based (PBT-based) TPEE film material that is configured to transport or diffuse moisture from one surface of the film material to a second opposite surface of the film material. The transport of the moisture may be facilitated by the presence of hydrophilic molecules (molecules that attract or have an affinity for water) within the film material where a greater number of hydrophilic molecules may result in a greater transport of moisture. The movement of moisture through the film material may be measured using a water vapor transmission test such as ASTM E96 B, and in example aspects, the water vapor transmission rate of the film material may be from about 600 $g/m^2/day$ to about 10,000 $g/m^2/day$, from about 1,000 $g/m^2/day$ to about 9,000 $g/m^2/day$, from about 3,000 $g/m^2/day$ to about 8,000 $g/m^2/day$, from about 5,000 $g/m^2/day$ to about 7,000 $g/m^2/day$, or about 6,000 $g/m^2/day$. As used herein, the term "about" means ±10% of an indicated value. An example PBT-based TPEE film material is TPEE48 manufactured by Far Eastern New Century Corporation in Taipei, Taiwan. Additional film materials contemplated herein include a thermoplastic polyurethane (TPU) film material or variants thereof, a thermoplastic poly(ether-amide) elastomer (TPAE) film material, and/or any film material capable of transporting or diffusing moisture from one surface of the film material to a second opposite surface of the film material.

When the film material is applied to the substrate material in a pattern of discrete overlay film structures, and the substrate material is exposed to, for example, moisture, the discrete overlay film structures undergo a change in dimension such as, for example, an increase in height in the z-direction, an increase in length in the y-direction, and/or an increase in width in the x-direction. Because the discrete overlay film structures are fully adhered to the substrate material, the change in dimension of the discrete overlay film structures causes the substrate material to pucker or be tensioned in the z-direction in areas underlying the discrete overlay film structures.

Unless otherwise noted, all measurements provided herein are measured at standard ambient temperature and pressure (25 degrees Celsius or 298.15 K and 1 bar).

FIG. 1 illustrates an example carrier sheet 100 that, in example aspects, has been extracted or removed from a run of carrier sheets. The carrier sheet 100 may be formed of a flexible/pliable material such as, for example, a fibrous or nonwoven material, and/or a woven composite material. In example aspects, the carrier sheet 100 may be coated with silicone, polytetrafluoroethylene, or other substances having a low coefficient of friction for easy release. In one example, the carrier sheet 100 may be a woven material of polytetrafluoroethylene fibers (commonly known as TEFLON®). In another example, the carrier sheet may be formed from a thin alloy metal such as steel that is coated with a low coefficient substance such as silicone and/or polytetrafluoroethylene. In example aspects, the carrier sheet 100 is configured for multiple uses with exposures to temperatures of about 100 degrees Celsius or greater. The use of a metal carrier sheet may allow for even more uses than, for example, carrier sheets formed from woven, fibrous, or non-woven materials.

The carrier sheet 100 includes a first surface 110 and a second surface 112 opposite the first surface 110. Each of the first surface 110 and the second surface 112 of the carrier sheet 100 is generally planar or smooth. The carrier sheet 100 includes a plurality of holes 114 that extend through the carrier sheet 100 from the first surface 110 to the second surface 112. The plurality of holes 114 may be in a desired pattern and may include holes of a same size, holes of a variable size, holes of a same shape, holes of a different shape, a greater number of holes than that illustrated in FIG. 1, a fewer number of holes than that illustrated in FIG. 1 (e.g., one hole), and/or a different pattern of holes than that illustrated in FIG. 1. It is contemplated herein that the plurality of holes 114 may be of a minimum size such as, for example, a minimum length of at least 5 mm and a minimum width of at least 5 mm, and/or a minimum diameter of at least 5 mm where the minimum size is sufficient so that a film material may extend through the plurality of holes 114 and transfer to a substrate material.

The carrier sheet 100 has a length 116 and a width 118. In example aspects, the width 118 may be less than the length 116, and in other example aspects, the width 118 may be substantially the same (e.g., within ±10%) as the length 116. The length 116 and the width 118 of the carrier sheet 100 may have different dimensions depending on an intended use. Although shown generally as a rectangle, it is contemplated herein that the carrier sheet 100 may have a different geometric shape depending on an intended use such as, for example, other geometric shapes, organic shapes, alphanumeric shapes, and the like.

Figure 2:
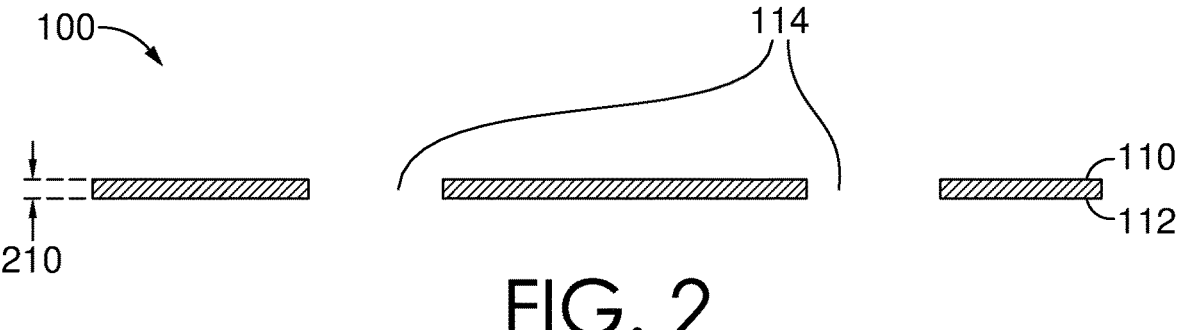
FIG. 2 illustrate a cross-section of the carrier sheet taken along cut line 1-1 of FIG. 1 in accordance with aspects herein.

FIG. 2 illustrates a cross-section of the carrier sheet 100 taken along cut line 2-2 of FIG. 1 and depicts the first surface 110 and the second surface 112 with a thickness 210 between the first surface 110 and the second surface 112. Example thicknesses may range from about 20 microns to about 700 microns, from about 30 microns to about 600 microns, or from about 50 microns to about 500 microns, although other thicknesses are contemplated herein. The plurality of holes 114 extend through the thickness 210 of the carrier sheet 100.

Figure 3:
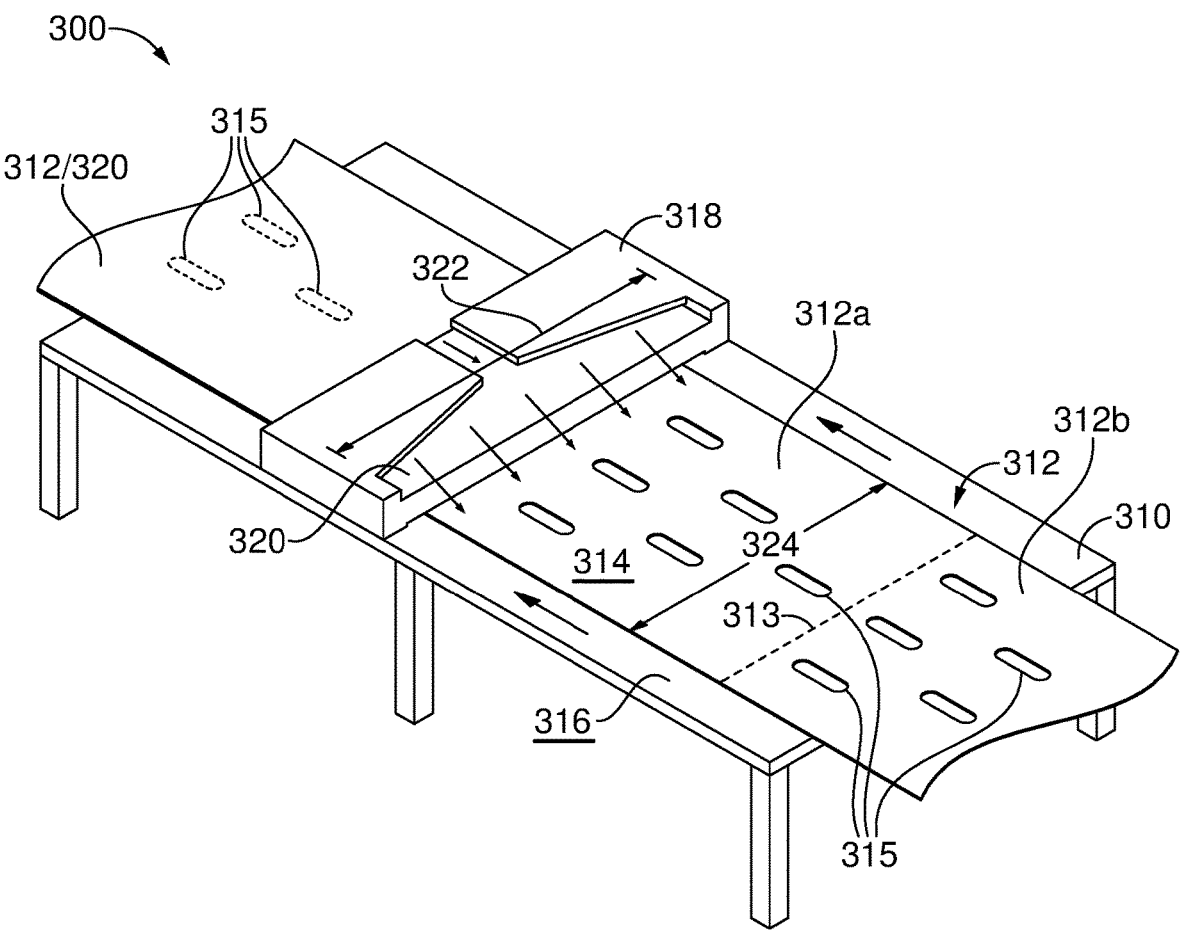
FIG. 3 illustrates an example system for producing a patterned film in accordance with aspects herein.

FIG. 3 illustrates a portion of an example system 300 for producing a patterned film for application to a substrate material. The system 300 is illustrative only and is meant to convey features of the system 300 but not necessarily the exact configuration, details, and/or dimensions of the system 300. The system 300 includes a transport assembly 310 that advances a run of carrier sheets 312 in a machine direction. The transport assembly 310 may include a roller transport assembly, an endless pattern belt, and the like. In one example aspect, the run of carrier sheets 312 includes a plurality of individual carrier sheets such as carrier sheet 312a and carrier sheet 312b that seamlessly extend from one another. The dashed line shown separating the carrier sheet 312a from the carrier sheet 312b indicates a separation line 313 between the carrier sheet 312a and the carrier sheet 312b. In example aspects, the separation line 313 may be a hypothetical line or it may include a physical marking or a physical separation line that may be used when extracting or removing individual carrier sheets from the run of carrier sheets 312.

The run of carrier sheets 312 include a first surface 314, a second surface opposite the first surface (not visible in FIG. 3), and a plurality of holes 315 extending through the thickness of the run of carrier sheets 312 from the first surface 314 to the second surface. In example aspects, the second surface of the run of carrier sheets 312 faces a surface 316 of the transport assembly 310 and is in contact or near contact with the surface 316 of the transport assembly 310. The first surface 314 of the run of carrier sheets 312 faces away from the surface 316 of the transport assembly 310 and is exposed.

As mentioned, the transport assembly 310 advances the run of carrier sheets 312 in a machine direction. In the system 300, the machine includes an extrusion device 318. The extrusion device 318 may include, for example, a T-die type extruder, a T-die coat hanger type extruder, a coat hanger extruder, and the like. In an example aspect not shown, the device 318 may be configured to blow a film material on to the first surface 314 of the run of carrier sheets 312. The extrusion device 318 is configured to continuously extrude a uniform thickness of a film material 320 (indicated graphically by arrows) on to the first surface 314 of the run of carrier sheets 312 as the transport assembly 310 advances the run of carrier sheets 312 past the extrusion device 318. The film material 320 may include a thermoplastic polyester elastomer (TPEE) film material, a thermoplastic polyurethane (TPU) film material, a thermoplastic poly(ether-amide) elastomer (TPAE) film material, and the like. In example aspects, the thickness of the film material 320 may be from about 10 microns to about 500 microns, from about 20 microns to about 450 microns, from about 30 microns to about 425 microns, from about 40 microns to about 400 microns, or from about 50 microns to about 300 microns.

The extrusion device 318 includes an extrusion emitting portion having a width 322 which extrudes the film material 320. In example aspects, the width 322 of the extrusion emitting portion of the extrusion device 318 is substantially the same (e.g., within about 10%) as a width 324 of the run of carrier sheets 312. As such, in example aspects, the width of the film material 320 is substantially the same as the width 324 of the run of carrier sheets 312 after it has been deposited on the first surface 314 of the run of carrier sheets 312.

Reference numeral 312/320 indicates the run of carrier sheets 312 after the film material 320 has been uniformly deposited on the first surface 314 of the run of carrier sheets 312 by the extrusion device 318. The plurality of holes 315 extending through the thickness of the run of carrier sheets 312 are shown in dashed lines to indicate that the plurality of holes 315 are covered by the film material 320. Aspects herein contemplate that after advancing past the extrusion device 318, the run of carrier sheets 312 includes a uniform thickness of the film material 320 that extends continuously and without interruption across the width 324 and a length of the run of carrier sheets 312.

Figure 4:
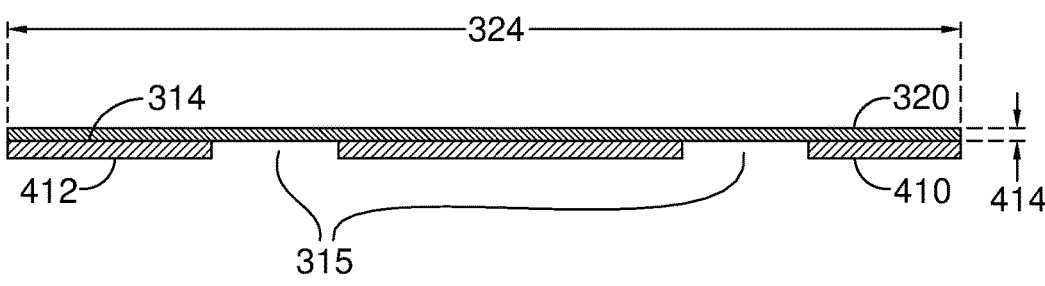
FIG. 4 illustrates a cross-section of a carrier sheet assembly produced by the system of FIG. 3 in accordance with aspects herein.

FIG. 4 illustrates a cross-section of a carrier sheet 410 with the film material 320 deposited thereon that is produced by the system 300. The carrier sheet 410 with the film material 320 deposited thereon may be known herein as a carrier sheet assembly 410/320. The carrier sheet assembly 410/320 may be extracted or removed from the run of carrier sheets having the film material deposited thereon 312/320. The carrier sheet 410 includes the first surface 314 and a second surface 412 opposite the first surface 314. The film material 320 is deposited on to the first surface 314 of the carrier sheet 410. The carrier sheet 410 also includes the plurality of holes 315 that extend through the thickness of the carrier sheet 410. The film material 320 has a uniform thickness 414 and extends continuously and without interruption across the width 324 of the carrier sheet 410. As such, the film material 320 extends across the plurality of holes 315 of the carrier sheet 410.

Figure 5:
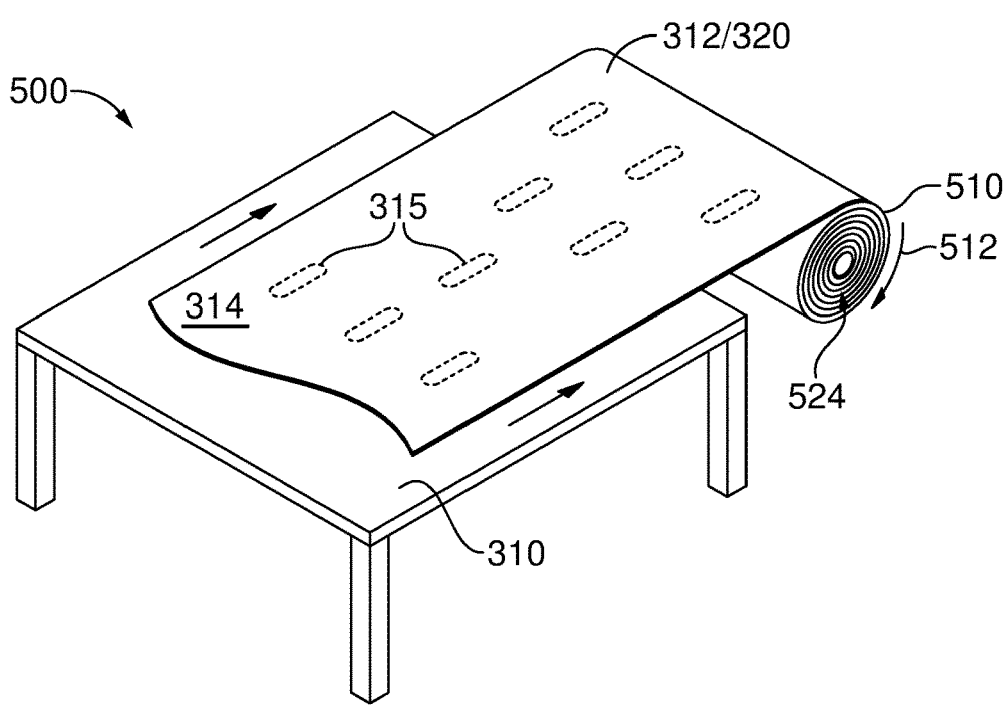
FIG. 5 illustrates an example rolling assembly for rolling a carrier sheet with a film material deposited thereon in accordance with aspects herein.

FIG. 5 illustrates an example system 500 having an example roller assembly 510. The system 500 may be part of the system 300. The system 500 and the roller assembly 510 are illustrative only and are meant to convey general features of the system 500 and the roller assembly 510 but not necessarily the exact configuration, details, and/or dimensions of the system 500 and the roller assembly 510. After the film material 320 is deposited on to the first surface 314 of the run of carrier sheets 312, it may be advanced to the roller assembly 510 by the transport assembly 310. The roller assembly 510, in example aspects, rolls the run of carrier sheets with the film material deposited thereon 312/320 around a central axis of rotation 512 to form a rolled good 524. The rolling of the run of carrier sheets with the film material deposited thereon 312/320 may occur immediately after advancing past the extrusion device 318 in some example aspects. In other example aspects, the run of carrier sheets with the film material deposited thereon 312/320 may pass through one or more drying or curing stations before being rolled into a rolled good 524. In example aspects, the film material 320, while in or while not in the form of the rolled good 524 may be cured for a period of, for instance, from 24 hours to about 36 hours before the film material 320 is applied to a substrate material. In some example aspects, a release paper may be applied to the run of carrier sheet with the film material deposited thereon 312/320 prior to rolling. The rolled good 524 may provide a convenient way of curing, storing and/or transporting the run of carrier sheets with the film material deposited thereon 312/320.

Figure 6:
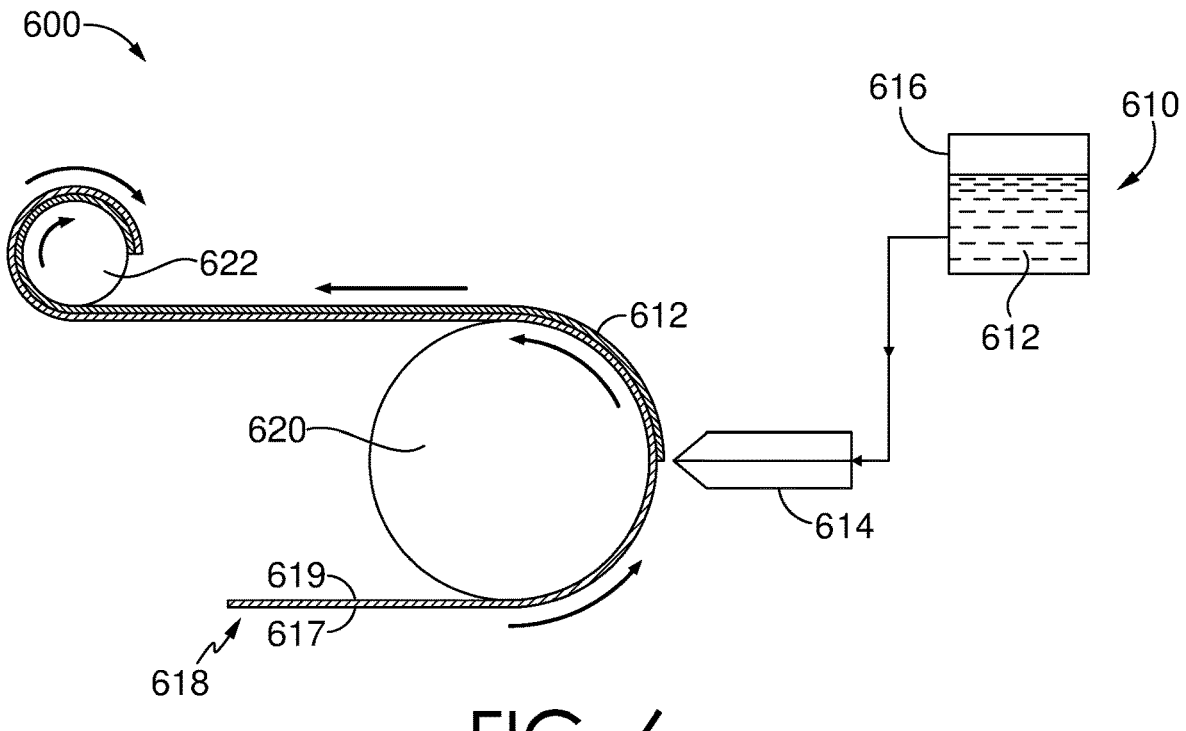
FIG. 6 illustrates a schematic cross-section side view of an example system for producing a patterned film in accordance with aspects herein.

FIG. 6 illustrates a schematic cross-section side view of an example system 600 for producing a patterned film. The example system 600 may include features of the system 300 and features of the system 500. The system 600 includes a delivery system 610 used to deliver a film material 612, such as the film material 320, to an extrusion device 614, such as the extrusion device 318. In one example aspect, and as shown in FIG. 6, the film material 612 may be in the form of a liquid before being delivered to the extrusion device 614. With respect to this aspect, the delivery system 610 may be configured in various different ways. For instance, the delivery system 610 may include a pump to move the liquid film material 612 from a tank 616 to the extrusion device 614. The delivery system 610 may include a pressure control system to help control the pressure of the liquid film material 612 fed from the pump. In other example aspects, the film material 612 may be in a solid or semi-solid state when it is delivered to the extrusion device 614 by the delivery system 610. In this example, the extrusion device 614 may be configured to melt the film material 612 to a liquid form before extruding the film material 612.

The film material 612 from the delivery system 610 passes through the extrusion device 614 and is uniformly deposited on to a first surface 617 of a run of carrier sheets 618 having holes extending there through, such as the run of carrier sheets 312. A transport assembly 620, such as the transport assembly 310 of the system 300, advances the run of carrier sheets 618 past the extrusion device 614. As shown, a second surface 619 of the run of carrier sheets 618 is positioned adjacent to a surface of the transport assembly 620. After advancing past the extrusion device 614, the transport assembly 620 advances the run of carrier sheets 618 with the film material 612 deposited thereon to a roller assembly 622, such as the roller assembly 510 of the system 500. The roller assembly 622 rolls the run of carrier sheets 618 with the film material 612 deposited thereon around a central axis of rotation to form a rolled good such as the rolled good 524. The rolled good may be stored to allow curing, or further curing, of the film material 612.

Figure 7:
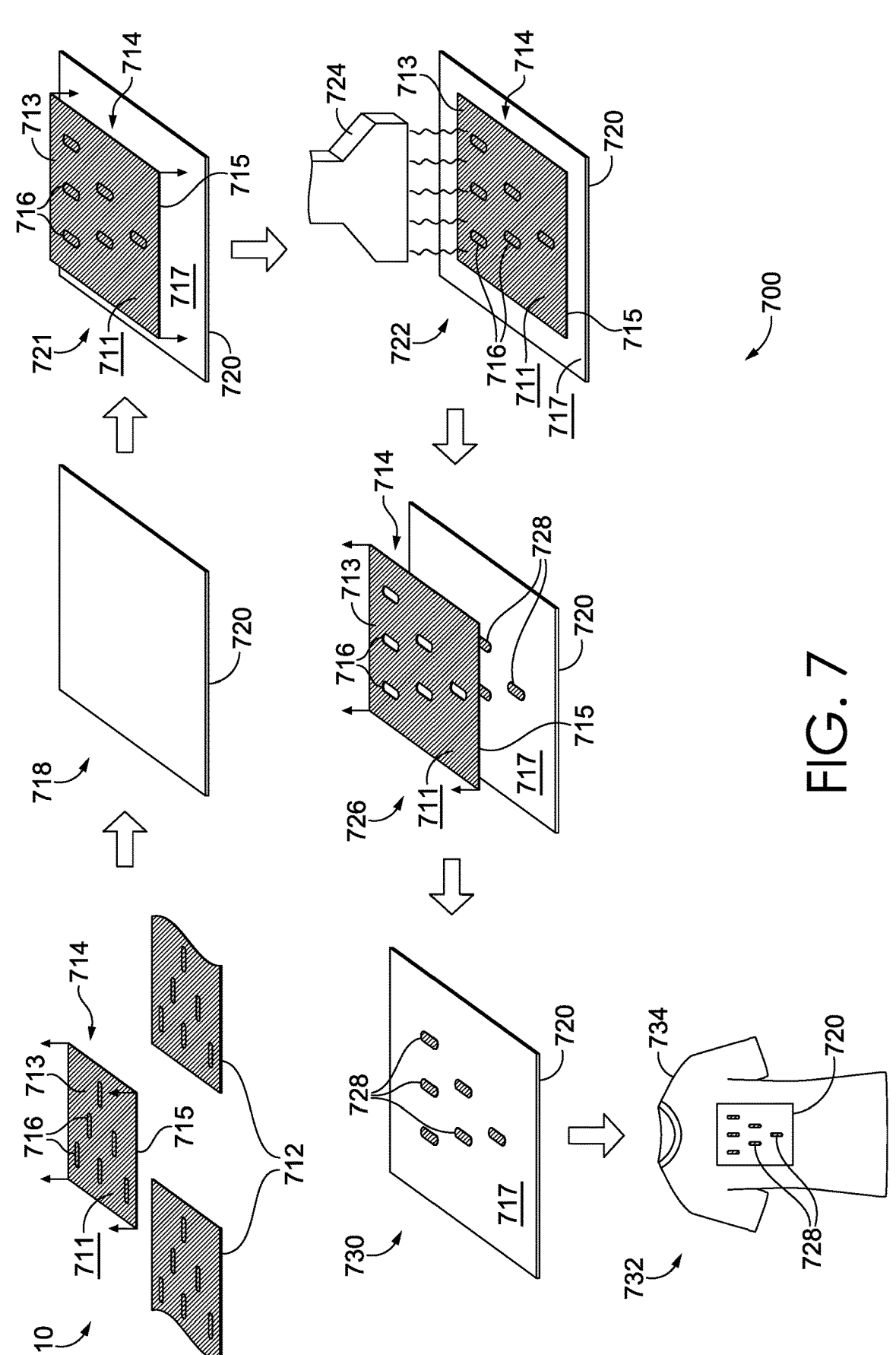
FIG. 7 illustrates a process flow for transferring a pattern of discrete overlay film structures on to a substrate material in accordance with aspects herein.

FIG. 7 illustrates a process flow for transferring a pattern of discrete overlay film structures on to a substrate material using a patterned film. At a step 710, a carrier sheet 714 is extracted or removed from a run of carrier sheets with a film material deposited thereon (indicated by reference numeral 712). The carrier sheet 714 includes a first surface 713, a second surface 715 opposite the first surface 713, and a plurality of holes 716 extending through the carrier sheet 714 from the first surface 713 to the second surface 715. A film material 711 is uniformly deposited on the first surface 713 of the carrier sheet 714. The deposition of the film material 711 on the carrier sheet 714 may occur, for example, using the system 300 and/or the system 600. In example aspects, the step 710 may occur at a production facility separate from the production facility that produces the run of carrier sheets with the film material deposited thereon 712. In other example aspects, the step 710 may occur at the same production facility as the production facility that produces the run of carrier sheets with the film material deposited thereon 712. Extraction of the carrier sheet assembly 714/711 may occur, for example, through a cutting process (e.g., laser cutting, die cutting, manual cutting, and the like) although other ways of extracting or removing the carrier sheet assembly 714/711 are contemplated herein.

At a step 718, a substrate material 720 is provided and may be positioned on a work surface. The substrate material 720 may be a knit material, a woven material, or a non-woven material. In example aspects, the substrate material 720 may be formed of yarns having a low moisture regain. In further example aspects, the substrate material 720 may include a lightweight or ultra-lightweight material. Any and all aspects, and any variation thereof, are contemplated as being within aspects herein. Although shown as a square, it is contemplated herein that the substrate material 720 may be in the form of a pattern piece for an article of apparel and thus may have a shape different than that shown. It is also contemplated herein that the substrate material 720 may be in the form of a continuous rolled good At a step 721, the second surface 715 of the carrier sheet assembly 714/711 is positioned on a first surface 717 of the substrate material 720. In example aspects, the positioning of the carrier sheet assembly 714/711 may occur through the use of registration marks (actual or virtual) on the substrate material 720. In further example aspects, the carrier sheet assembly 714/711 may be maintained in position on the substrate material 720 through use of a releasable adhesive, although it is contemplated herein that a releasable adhesive may not be used. Although not shown, it is contemplated herein that a release paper as is known in the art may be positioned on the first surface 713 of the carrier sheet assembly 714/711. In example aspects, the release paper may have a uniform surface texture or a non-uniform surface texture.

At a step 722, heat and/or pressure, and/or other types of energy (e.g., magnetic, ultrasound, light) is applied to the carrier sheet assembly 714/711 using, for instance, a device 724. The device 724 may include, for example, a static heat press, a heat emitting device, a press, an energy emitting device (e.g., light, ultrasound, magnetic), and the like. The device 724, in example aspects, may also be a continuous fusing machine that utilizes, for examples, rollers or belts to move the substrate material 720 in a machine direction while applying continuous heat and/or pressure. In example aspects, the device 724 may apply heat and/or pressure, and/or other forms of energy to the first surface 713 of the carrier sheet assembly 714/711. In other example aspects, the device 724 may apply heat and/or pressure, and/or other types of energy to the first surface 713 of the carrier sheet assembly 714/711 as well as to a second surface of the substrate material 720 (not shown).

In example aspects, the device 724 may apply a temperature of from about 175 degrees Celsius to about 230 degrees Celsius, from about 190 degrees Celsius to about 220 degrees Celsius, or from about 105 degrees Celsius to about 200 degrees Celsius to the carrier sheet assembly 714/711 at a pressure of from about 4 Bars to about 8 Bars, or from about 5 Bars to about 7 Bars. The heat may be applied to the carrier sheet assembly 714/711 from about 5 seconds to about 50 seconds, or from about 5 seconds to about 45 seconds. The temperature, pressure, and time variables may be dependent upon a thickness of the film material 711, the type of film material used, the type of substrate material used, a thickness of the substrate material 720, and the like.

Application of heat and/or pressure, and/or other types of energy to the carrier sheet assembly 714/711 causes the film material 711 to adhere to the first surface 717 of the substrate material 720 at areas corresponding to the plurality of holes 716 in the carrier sheet 714. In one example aspect, the heat and/or pressure, and/or other types of energy may cause the film material 711 to fully melt and flow on to the substrate material 720 where it subsequently cools and adheres to the substrate material 720. In other example aspects, the heat and/or pressure, and/or other types of energy may cause the film material 711 to at least partially melt such that the film material 711 extends through the plurality of holes 716 in the carrier sheet 714 and adheres to the first surface 717 of the substrate material 720. Any and all aspects, and any variation thereof, are contemplated as being within aspects herein. In some example aspects, the device 724 may apply heat and/or pressure more than once. For example, a two-pass approach may be used where the device 724 applies heat and/or pressure to the carrier sheet assembly 714/711 for a time period of from about 20 seconds to about 40 seconds, or about 30 seconds, to cause the film material 711 to generally adhere to the substrate material 720. The device 724 may then apply heat and/or pressure to the carrier sheet assembly 714/711 a second time for a time period of from about 5 seconds to about 15 seconds, or about 10 seconds to fully adhere the film material 711 to the substrate material 720. For instance, the second pass may increase the penetration depth of the film material 711 in the substrate material 720. It has been found that using a two-pass approach may decrease the chances of delamination of the film material 711 from the substrate material 720 especially at edges to the film material 711.

At a step 726, the carrier sheet assembly 714/711 is removed from the first surface 717 of the substrate material 720 leaving a pattern of discrete overlay film structures 728 on the substrate material 720 at areas corresponding to the plurality of holes 716 in the carrier sheet 714. In example aspects, where a release paper having a non-uniform surface texture is used, the surface texture of the release paper may be imparted to the pattern of discrete overlay film structures 728 during the transfer process as explained further below with respect to FIG. 15. Because the carrier sheet 714 blocks, masks, or prevents remaining portions of the film material 711 (e.g., the film material 711 at areas of the carrier sheet 714 not including the plurality of holes 716) from contacting the substrate material 720, the remaining portions of the film material 711 are removed when the carrier sheet 714 is detached from the substrate material 720. Said differently, the remaining portions of the film material 711 that are removed from the carrier sheet have a pattern that corresponds to the negative of the pattern of discrete overlay film structures 728 on the substrate material 720.

Step 730 illustrates the substrate material 720 after the carrier sheet 714 has been removed. As shown, the substrate material 720 includes the pattern of discrete overlay film structures 728 corresponding to the pattern of the plurality of holes 716 in the carrier sheet 714. At a step 732, the substrate material 720 having the pattern of discrete overlay film structures 728 is incorporated into an article of apparel 734. Although shown as an upper-body garment, it is contemplated herein that the article of apparel 734 may comprise other types of garments, articles of headwear, gloves, shoes, and the like. Although the substrate material 720 is shown being incorporated on to the front of the article of apparel 734, it is contemplated herein that the substrate material 720 may be incorporated into other locations than that shown. In example aspects, the steps 718 through 732 may be carried out at the production facility that produces the patterned film or the steps 718 through 732 may be carried out at one or more different production facilities.

FIG. 8 depicts a cross-section of a carrier sheet assembly 800 including a carrier sheet 810 having a plurality of holes 811 extending there through and a film material 812 deposited on a first surface of the carrier sheet 810. The carrier sheet assembly 800 further includes an adhesive layer 814 affixed to a second opposite surface of the carrier sheet 810. In one example aspect, the adhesive layer 814 comprises a pressure-sensitive adhesive that is activated upon application of pressure. In other example aspects, the adhesive layer 814 may include a low melt thermoplastic polyurethane that enables a lower application temperature when transferring the film material 812 to a substrate material. As shown, the adhesive layer 814 extends across the carrier sheet 810 including extending across the plurality of holes 811. When the carrier sheet assembly 800 is applied to a substrate material such as the substrate material 720 and pressure and/or heat, and/or other types of energy are applied, the adhesive layer 814 may adhere to the substrate material, and the film material 812 may adhere to the adhesive layer 814 at areas corresponding to the plurality of holes 811 in the carrier sheet 810. The use of an adhesive layer is illustrative only, and it is contemplated herein that an adhesive layer may not be used.

FIG. 9 depicts a flow diagram of an example method 900 method of producing a film pattern on a substrate material using a patterned film. The method 900 may at least partially be carried out using the system 300 and/or the system 600 and may include steps shown in FIG. 7. At a step 910, a uniform thickness of a film material, such as the film material 320 is continuously extruded on to a first surface of a run of carrier sheets, such as the run of carrier sheets 312, where each carrier sheet has a plurality of holes extending there through.

At a step 912, a first carrier sheet is extracted from the run of carrier sheets. In example aspects, the first carrier sheet may be extracted by way of a cutting process that may utilize markings on the run of carrier sheets as an indication of where to cut. Other ways of extracting the carrier sheet are contemplated herein. At a step 914, a second surface of the first carrier sheet is applied to a substrate material, such as the substrate material 720 of FIG. 7.

At a step 916, one or more of heat and/or pressure, and/or other types of energy are applied to the first carrier sheet to cause the film material to transfer to the substrate material at areas corresponding to the holes in the first carrier sheet. At a step 918, the first carrier sheet is removed from the substrate material. Removal of the first carrier sheet from the substrate material also removes portions of the film material at areas not corresponding to the holes in the carrier sheet. The end result of the method 900 is a pattern of discrete overlay film structures on the substrate material, where the pattern of the discrete overlay film structures is the same as the pattern of the holes in the carrier sheet.

FIG. 10 depicts a flow diagram of an example method 1000 of producing a patterned film. The method 1000 may be carried out using the system 300 and the system 500, and/or the system 600 in example aspects. At a step 1012, a uniform thickness of a film material is continuously extruded on to a first surface of a run of carrier sheets. Each carrier sheet in the run of carrier sheets includes one or more holes extending there through. At a step 1014, the run of carrier sheets with the film material deposited thereon may be rolled, using, for instance, the roller assembly 510, around a central axis of rotation to form a rolled good such as the rolled good 524. At a step 1016, the film material is cured. In example aspects, the curing may occur when the run of carrier sheets with the film material deposited thereon is in the form of a rolled good. In other example aspects, step 1016 may occur prior to the rolling of the run of carrier sheets with the film material deposited thereon.

FIG. 11 illustrates a flow diagram of an example method 1100 of generating a pattern of discrete overlay film structures on a substrate material. The method 1100 may be carried out, for instance, using the steps shown in FIG. 7. At a step 1112, a second surface of a carrier sheet having a film material uniformly deposited thereon, such as the carrier assembly 714/711, is applied to a surface of a substrate material, such as the substrate material 720. The carrier sheet includes a plurality of holes such as the plurality of holes 716. At a step 1114, heat and/or pressure, and/or other types of energy are applied to the carrier sheet using a device, such as the device 724 to cause the film material to transfer to the substrate material at areas corresponding to the plurality of holes. At a step 1116, the carrier sheet is removed from the substrate material leaving a pattern of discrete overlay film structures on the substrate material and removing the remaining portions of the film material. The pattern of discrete overlay film structures has a pattern corresponding to the plurality of holes in the carrier sheet.

Figure 12:
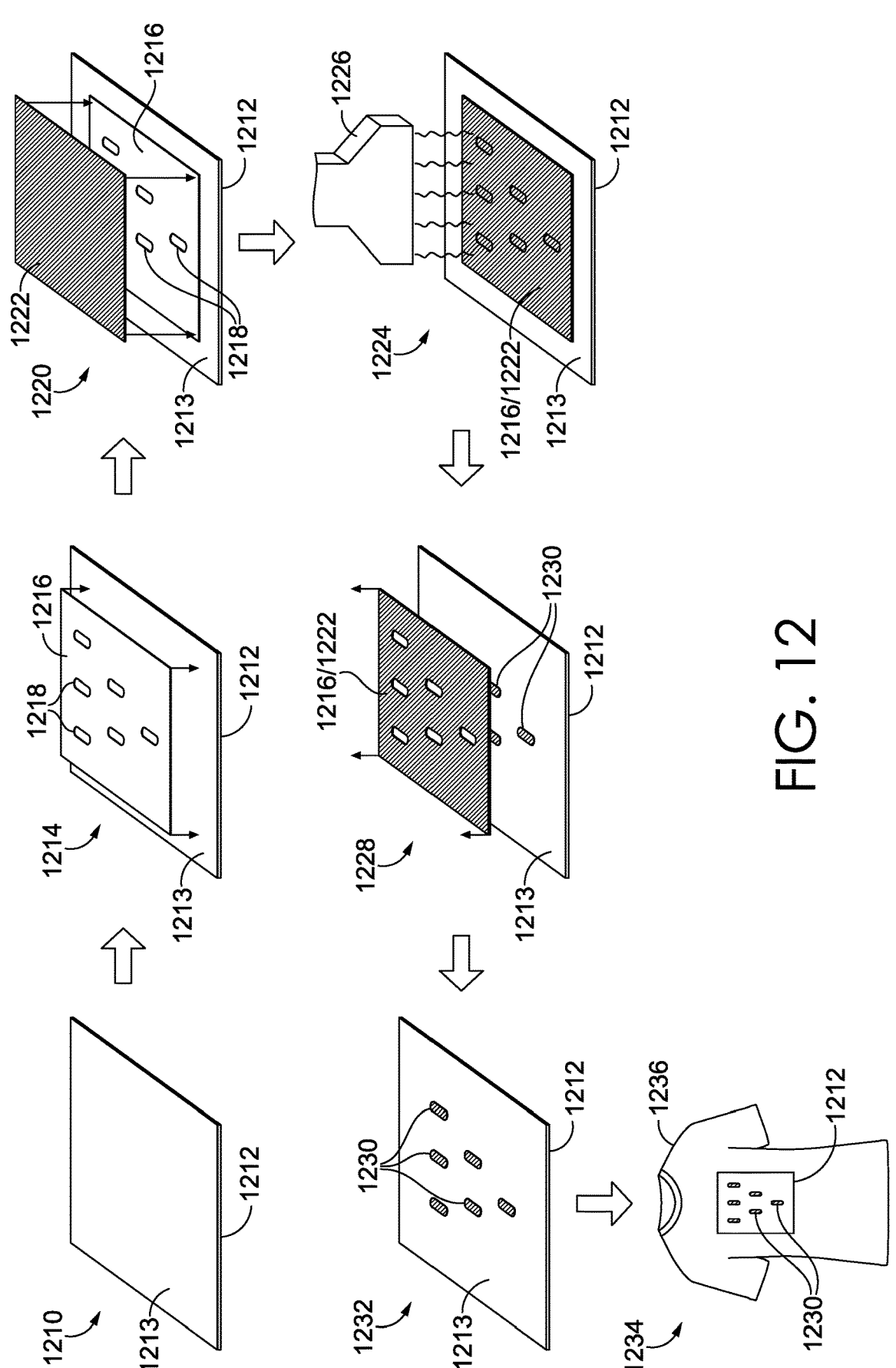
FIG. 12 illustrates another example process flow for transferring a pattern of discrete overlay film structures on to a substrate material in accordance with aspects herein.

FIG. 12 illustrates another example process flow for transferring a pattern of discrete overlay film structures on to a substrate material. At a step 1210, a substrate material 1212 is provided having a first surface 1213. The substrate material 1212 may be the same as the substrate material 720 of FIG. 7. At a step 1214, a carrier sheet 1216 having a plurality of holes 1218 extending there through is positioned on the first surface 1213 of the substrate material 1212. In this example aspect, the carrier sheet 1216 does not include a film material deposited thereon. The carrier sheet 1216 may be formed of the materials described herein (e.g., fibrous, non-woven, woven, or metal alloy) and may include the same characteristics as the carrier sheets described herein.

At a step 1220, a film material 1222 is positioned overtop the carrier sheet 1216. The film material 1222 may be formed of the materials described herein and may include the same characteristics as the film materials described herein. The film material 1222 may be from a rolled film, and the film material 1222 may optionally be cut to have the same shape as the carrier sheet 1216 in example aspects.

Although not shown, a release paper may be positioned over the film material 1222. In example aspects, and as described with respect to FIG. 15, the release paper may comprise a non-uniform surface texture. At a step 1224, a device 1226 applies heat and/or pressure, and/or other types of energy to the film material 1222 to cause the film material 1222 to transfer to the substrate material 1212 through the plurality of holes 1218 in the carrier sheet 1216. Similar to what was described with respect to the process flow shown in FIG. 7, the device 1226 may be, for example, a static heat press or a continuous fusing machine. In example aspects, a two-pass approach may be used where the device 1226 applies heat and/or pressure for an initial time period to adhere the film material 1222 to the substrate material 1212 and for a second time period that is less than the initial time period to cause greater penetration of the film material 1222 into the substrate material 1212 to reduce the chances of delamination.

At a step 1228, the carrier sheet 1216 having remaining portions of the film material 1222 thereon is removed from the substrate material 1212 leaving a pattern of discrete overlay film structures 1230 formed from the film material 1222. The pattern of discrete overlay film structures 1230 has the same pattern as the plurality of holes 1218 in the carrier sheet 1216. In example aspects, where a release paper having a non-uniform surface texture is used, the surface texture may be imparted to the pattern of discrete overlay film structures 1230 during the transfer process. The remaining portions of the film material 1222 on the carrier sheet 1216 is the negative of the pattern of discrete overlay film structures 1230. Step 1232 illustrates the substrate material 1212 after the carrier sheet 1216 has been removed and further illustrates the pattern of discrete overlay film structures 1230. At a step 1234, the substrate material 1212 having the pattern of discrete overlay film structures 1230 is incorporated into an article of apparel 1236.

Figures 13A, 13B:
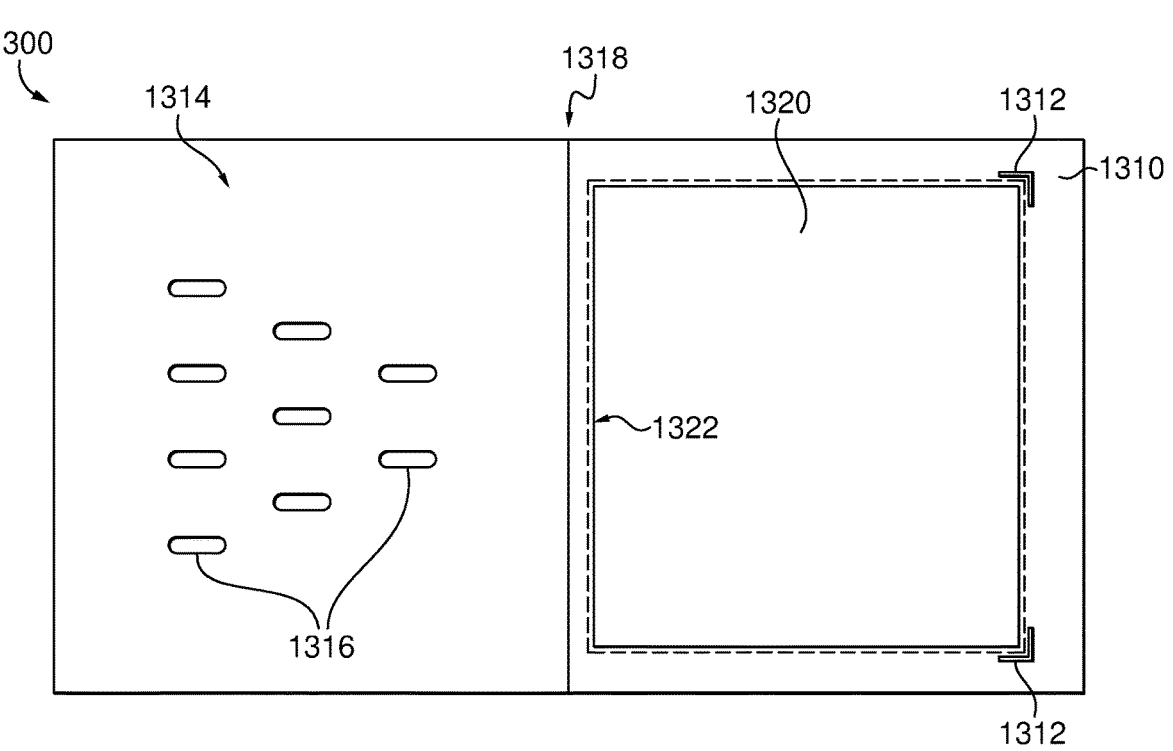
FIGS. 13A-13B illustrate an example jig for use in transferring a pattern of discrete overlay film structures on to a substrate material in accordance with aspects herein.

FIGS. 13A and 13B depict an example jig 1300 that may be used, for example, in the process flow shown in FIG. 12. With respect to FIG. 13A, the jig 1300 includes a base surface 1310. The base surface 1310 may be formed of a heat-resistant material including, for example, rubber materials, polymeric materials, textile materials, metal materials, and the like. The base surface 1310 may optionally include registration marks 1312. The registration marks 1312 may be fixed in position such that the registration marks 1312 are generally specific for a particular pattern piece, or the registration marks 1312 may be movable to accommodate different pattern pieces of a substrate material. The registration marks 1312 may include visual markings, indentations or grooves in the base surface 1310, projections extending away from the base surface 1310, and the like.

The jig 1300 further includes a carrier sheet 1314 having holes 1316 such as the carrier sheet 1216 of FIG. 12. The carrier sheet 1314 is fixed along one edge (e.g., by stitching, bonding, welding, mechanical coupling, and the like) to the base surface 1310 as indicated by reference numeral 1318. The edge of fixation 1318 between the carrier sheet 1314 and the base surface 1310 acts as a hinge enabling the carrier sheet 1314 to be folded over on to the base surface 1310. A substrate material 1320 is shown positioned on the base surface 1310. To ensure repeated registration of the substrate material 1320, an edge 1322 of the substrate material 1320 is positioned against the edge of fixation 1318 between the carrier sheet 1314 and the base surface 1310.

FIG. 13B illustrates the jig 1300 as the carrier sheet 1314 is positioned over the base surface 1310 with the edge of fixation 1318 acting as a hinge. As shown in FIG. 13B, the registration marks 1312 protrude from the base surface 1310. The edge 1322 of the substrate material 1320 is positioned against the edge of fixation 1318. Once the carrier sheet 1314 is positioned overtop the base surface 1310, a film material and optionally a release paper may be positioned overtop the carrier sheet 1314 and the assembly may be subjected to a heat and/or pressure process to transfer a plurality of discrete overlay film structure on to the substrate material 1320.

Figure 14:
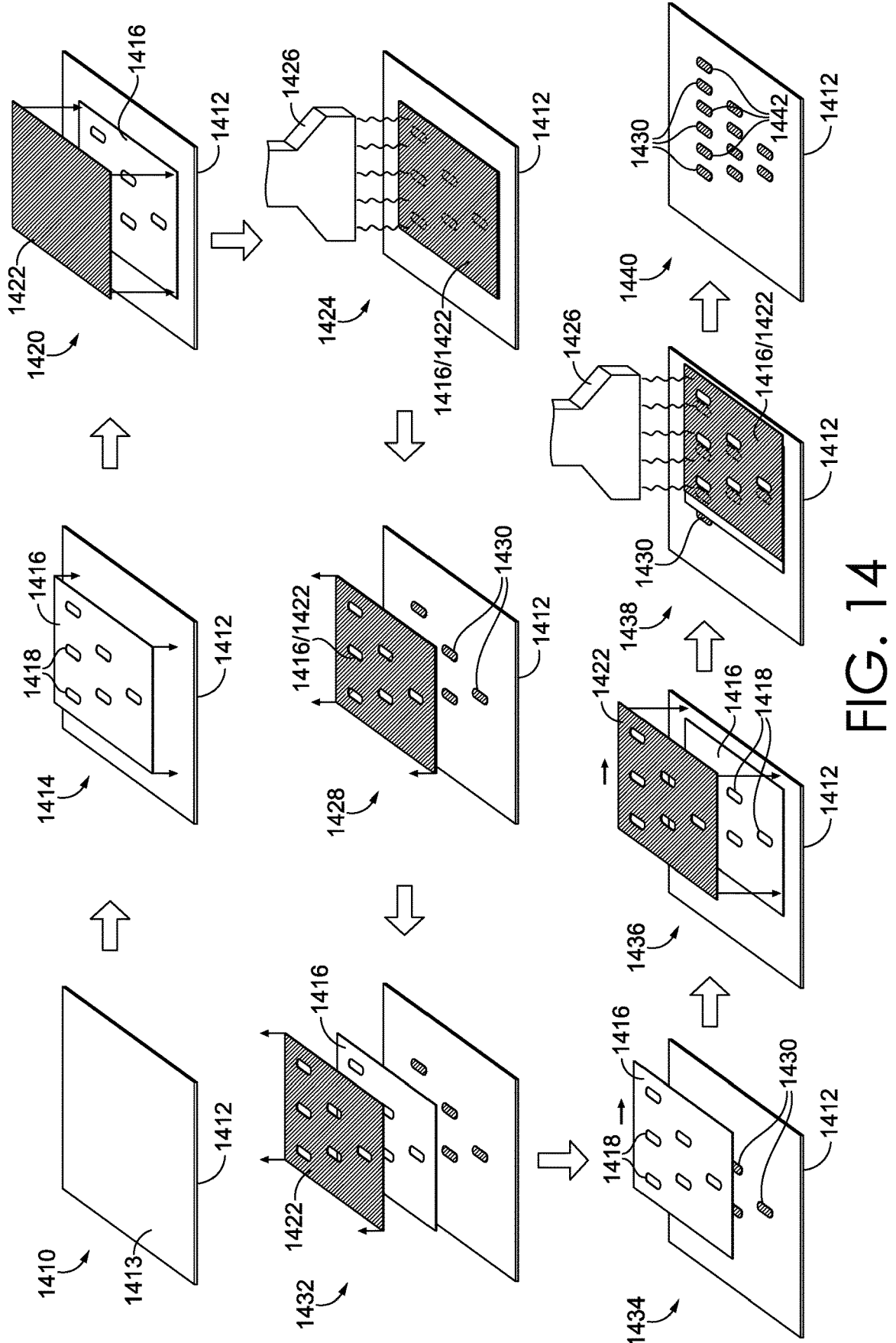
FIG. 14 illustrates an example process flow for maximizing utilization of a film material when transferring a pattern of discrete overlay film structures on to a substrate material in accordance with aspects herein.

FIG. 14 illustrates a process flow configured to maximize utilization of a film material. The process flow in FIG. 14 shares some of the same steps as the process flow depicted in FIG. 12, and the description of FIG. 12 may be equally applicable to some of the process flow steps of FIG. 14. At a step 1410, a substrate material 1412 is provided having a first surface 1413. The substrate material 1412 may be in the form of a rolled good (e.g., a continuous sheet), a pattern piece, and the like. At a step 1414, a carrier sheet 1416 having a plurality of holes 1418 extending there through is positioned on the first surface 1413 of the substrate material 1412. The carrier sheet 1416 may be formed of the materials described herein (e.g., fibrous, non-woven, woven, or metal alloy) and may include the same characteristics as the carrier sheets described herein.

At a step 1420, a film material 1422 is positioned over the carrier sheet 1416. The film material 1422 may be formed of the materials described herein and may include the same characteristics as the film materials described herein. The film material 1422 may be from a rolled film or a sheet form, and the film material 1422 may optionally be cut to have the same shape as the carrier sheet 1416 in example aspects. Although not shown, a release paper may be positioned over the film material 1422. At a step 1424, a device 1426 applies heat and/or pressure, and/or other types of energy to the film material 1422 to cause the film material 1422 to transfer to the substrate material 1412 through the plurality of holes 1418 in the carrier sheet 1416. Similar to what was described with respect to the process flow shown in FIG. 7, the device 1426 may be, for example, a static heat press, a continuous fusing machine, and the like. In example aspects, a two-pass approach may be used where the device 1426 applies heat and/or pressure for an initial time period to adhere the film material 1422 to the substrate material 1412 and for a second time period that is less than the initial time period to cause greater penetration of the film material 1422 into the substrate material 1412 to reduce the chances of delamination.

At a step 1428, the carrier sheet 1416 having remaining portions of the film material 1422 thereon is removed from the substrate material 1412 leaving a first pattern of discrete overlay film structures 1430 formed from the film material 1422. The first pattern of discrete overlay film structures 1430 has the same pattern as the plurality of holes 1418 in the carrier sheet 1416. The remaining portions of the film material 1422 on the carrier sheet 1416 is the negative of the first pattern of discrete overlay film structures 1430.

At a step 1432, the film material 1422 is removed from the carrier sheet 1416. The removal of the film material 1422 from the carrier sheet 1416 is facilitated by coating the carrier sheet 1416 with a non-stick coating such as silicone, polytetrafluoroethylene, and the like. At a step 1434, the carrier sheet 1416 is positioned on the substrate material 1412 at a new position that is offset from the position shown at the step 1414 as indicated by the arrow. The offset may be in a ±x-direction, a ±y-direction, or a combination of a ±x-direction and a ±y-direction. The offset may also be skewed from the ±x-direction and/or the ±y-direction (i.e., at a diagonal). In example aspects, the carrier sheet 1416 is positioned on the substrate material 1412 such that the plurality of holes 1418 in the carrier sheet 1416 do not overlap the first pattern of discrete overlay film structures 1430. It is contemplated herein that a carrier sheet having a different pattern of holes may be used instead of the carrier sheet 1416. It is also contemplated herein that the carrier sheet 1416 or a carrier sheet having a different pattern of holes may be applied to a different substrate material than the substrate material 1412. Any and all aspects, and any variation thereof, are contemplated as being within aspects herein.

At a step 1436, the film material 1422 is applied to the carrier sheet 1416. The film material 1422 is positioned on the carrier sheet 1416 such that the holes in the film material 1422 are offset, including completely offset, from the plurality of holes 1418 in the carrier sheet 1416. By doing this, remaining areas of the film material 1422 (i.e., the non-transferred areas) are positioned to cover the plurality of holes 1418 in the carrier sheet 1416. At a step 1438, the device 1426 applies heat and/or pressure and/or other types of energy to the film material 1422 to cause the film material 1422 to transfer to the substrate material 1412 through the plurality of holes 1418 in the carrier sheet 1416. A two-pass approach may also be used at the step 1438. Step 1440 illustrates the substrate material 1412 after the carrier sheet assembly 1416/1422 has been removed. The first pattern of discrete overlay film structures 1430 is present and, in addition, a second pattern of discrete overlay film structures 1442 is applied to the substrate material 1412. The steps shown in the process flow of FIG. 14 allow for maximum utilization of the film material 1422 which may reduce manufacturing costs.

Figure 15:
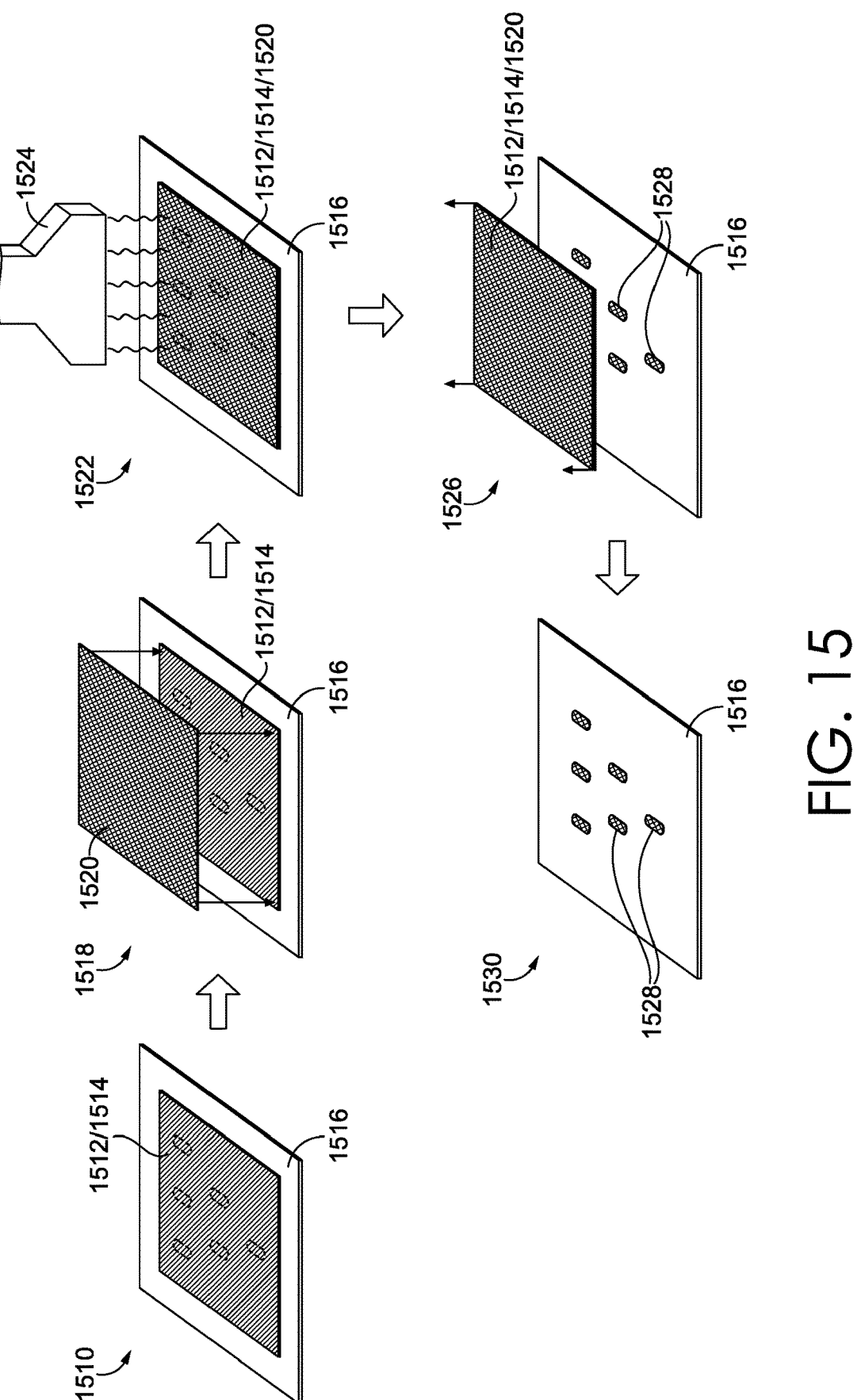
FIG. 15 illustrates an example process flow for imparting a texture to discrete overlay film structures on a substrate material in accordance with aspects herein.

FIG. 15 depicts a process flow for applying a texture to discrete overlay film structures deposited on a substrate material. The process flow shown in FIG. 15 may be used in combination with the process flows depicted in FIGS. 7, 12, and 14. At a step 1510, a carrier sheet 1512 having a film material 1514 positioned or deposited thereon, is positioned overtop a substrate material 1516. The film material 1514 is depicted with negatively sloped hatching. At a step 1518, a textured release paper 1520 is positioned overtop the carrier sheet assembly 1512/1514. The texture on the release paper 1520 is indicated by cross-hatching and may include any type of texture formed by projections extending away from a surface of the release paper 1520. At a step 1522, a device 1524 applies heat, and/or pressure, and/or other types of energy to the assembly comprising the release paper 1520, the film material 1514, and the carrier sheet 1512 to cause the film material 1514 to be deposited on the substrate material 1516 through the holes in the carrier sheet 1512. Because the film material 1514 is generally in a semi-soft or liquid state when being deposited, the pressure applied by the device 1524 transfers the pattern of the release paper 1520 to the film material 1514.

At a step 1526, the assembly comprising the release paper 1520, the film material 1514, and the carrier sheet 1512 is removed from the substrate material 1516 leaving a pattern of discrete overlay film structures 1528 having a texture corresponding to the texture of the release paper 1520 as further shown at the step 1530. Applying different textures to discrete overlay film structures may be useful for imparting different aesthetic properties to a substrate material (e.g., matte film structures versus shiny film structures). As well, different textures may be used to improve the feel of the film structures especially when the film structures are positioned adjacent a skin surface of a wearer. For example, a slightly rough surface texture may prevent the film structures from sticking to the skin surface of the wearer which improves wearer comfort.

Figure 16:
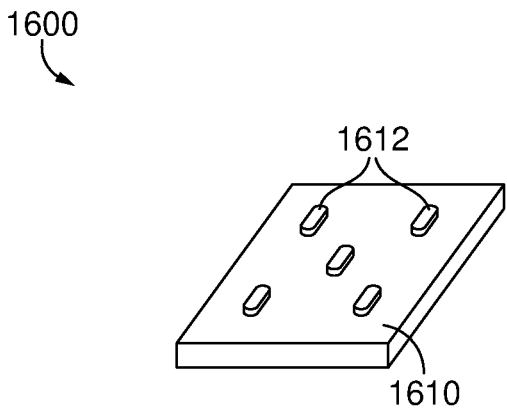
FIG. 16 illustrates a transfer device configured to point transfer a pattern of discrete overlay film structures on to a substrate material in accordance with aspects herein.

FIG. 16 depicts a transfer device 1600 configured to point transfer a pattern of discrete overlay film structures on to a substrate material. The transfer device 1600 includes a base surface 1610 from which a plurality of transfer points 1612 extend. Stated differently, the transfer points 1612 extend away from a surface plane of the base surface 1610. In example aspects, the base surface 1610 may be constructed from a variety of different materials configured to withstand heat, pressure, and multiple uses. In one example, the base surface 1610 may be a metal. The transfer points 1612 may be constructed of a material configured to transmit heat such as, for example, a metal or ceramic material.

Figure 17:
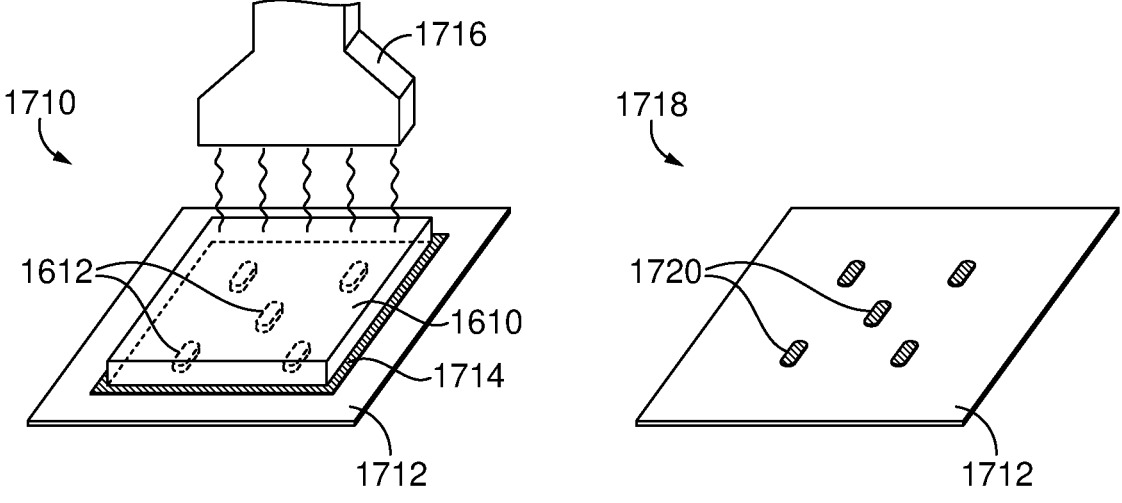
FIG. 17 illustrates an example process flow that utilizes the transfer device of FIG. 17 to transfer a pattern of discrete overlay film structures on to a substrate material in accordance with aspects herein.

FIG. 17 depicts a process flow that utilizes the transfer device 1600 to point transfer a film material to a substrate material. At a step 1710, the transfer device 1600 is positioned overtop a film material 1714 which, in turn, has been positioned overtop a substrate material 1712. A device 1716 applies heat and/or pressure to the transfer device 1600 which causes the transfer points 1612 to melt the film material 1714 in areas of contact. The melting of the film material 1714 at locations corresponding to the transfer points 1612 creates a pattern of discrete overlay film structures 1720 on the substrate material 1712 as shown at a step 1718. The process flow shown in FIG. 17 may eliminate the need for carrier sheets in one example aspect.

The following clauses represent example aspects of concepts contemplated herein. Any one of the following clauses may be combined in a multiple dependent manner to depend from one or more other clauses. Further, any combination of dependent clauses (clauses that explicitly depend from a previous clause) may be combined while staying within the scope of aspects contemplated herein. The following clauses are examples and are not limiting.

Clause 1. A method for producing a film pattern on a substrate material, the method comprising: continuously extruding a uniform thickness of a film material on to a first surface of a run of carrier sheets, each carrier sheet of the run of carrier sheets having a plurality of holes extending there through; extracting a first carrier sheet from the run of carrier sheets; subsequently applying a second opposite surface of the first carrier sheet to the substrate material; applying one or more of heat and pressure to the first carrier sheet to cause the film material to transfer to the substrate material at areas corresponding to the plurality of holes in the first carrier sheet; and removing the first carrier sheet from the substrate material.

Clause 2. The method for producing the film pattern on the substrate material according to clause 1, wherein the uniform thickness of the film material is from about 40 microns to about 200 microns.

Clause 3. The method for producing the film pattern on the substrate material according to any of clauses 1 through 2, wherein the second surface of the first carrier sheet includes an adhesive.

Clause 4. The method for producing the film pattern on the substrate material according to any of clauses 1 through 3, further comprising curing the film material for a defined period of time before applying the second surface of the first carrier sheet to the substrate material.

Clause 5. The method for producing the film pattern on the substrate material according to any of clauses 1 through 4, wherein the substrate material includes one or more of a knit material, a woven material, and a non-woven material.

Clause 6. The method for producing the film pattern on the substrate material according to any of clauses 1 through 5, wherein removing the first carrier sheet from the substrate material also removes portions of the film material at areas not corresponding to the plurality of holes in the first carrier sheet from the substrate material.

Clause 7. The method for producing the film pattern on the substrate material according to any of clauses 1 through 6, wherein the film material comprises one of a thermoplastic polyester elastomer (TPEE) film material, a thermoplastic polyurethane (TPU) film material, or a thermoplastic poly(ether-amide) elastomer (TPAE) film material.

Clause 8. A method for producing a film pattern on a substrate material, the method comprising: continuously extruding a uniform thickness of a film material on to a first surface of a run of carrier sheets, each carrier sheet of the run of carrier sheets having a plurality of holes extending there through; curing the film material for a defined period of time; extracting a first carrier sheet from the run of carrier sheets; subsequently applying a second opposite surface of the first carrier sheet to the substrate material; applying one or more of heat and pressure to the first carrier sheet to cause the film material to adhere to the substrate material at areas corresponding to the plurality of holes in the first carrier sheet; and removing the first carrier sheet from the substrate material such that portions of the film material at areas not corresponding to the plurality of holes in the first carrier sheet are also removed from the substrate material.

Clause 9. The method for producing the film pattern on the substrate material according to clause 8, wherein the uniform thickness of the film material is from about 40 microns to about 200 microns.

Clause 10. The method for producing the film pattern on the substrate material according to any of clauses 8 through 9, wherein the defined period of time for curing the film material is from about 24 hours to about 36 hours.

Clause 11. The method for producing the film pattern on the substrate material according to any of clauses 8 through 10, wherein the substrate material includes one or more of a knit material, a woven material, and a non-woven material.

Clause 12. The method for producing the film pattern on the substrate material according to any of clauses 8 through 11, wherein the film material comprises one of a thermoplastic polyester elastomer (TPEE) film material, a thermoplastic polyurethane (TPU) film material, or a thermoplastic poly(ether-amide) elastomer (TPAE) film material.

Clause 13. A system for producing a patterned film, the system comprising: a run of carrier sheets, each carrier sheet of the run of carrier sheets having a plurality of holes extending there through; a transport assembly that advances the run of carrier sheets past an extrusion device that continuously extrudes a uniform thickness of a film material on to a first surface of the run of carrier sheets; and a rolling assembly that rolls the run of carrier sheets with the film material deposited thereon around a central axis of rotation.

Clause 14. The system for producing the patterned film according to clause 13, wherein the run of carrier sheets has a length and a width, and wherein an extrusion emitting portion of the extrusion device has a width that is substantially the same as the width of the run of carrier sheets.

Clause 15. The system for producing the patterned film according to any of clauses 13 through 14, wherein the uniform thickness of the film material is from about 40 microns to about 200 microns.

Clause 16. The system for producing the patterned film according to any of clauses 13 through 15, wherein the transport assembly includes a surface, and wherein a second surface of the run of carrier sheets is positioned on the surface of the transport assembly.

Clause 17. The system for producing the patterned film according to any of clauses 13 through 16, wherein the film material comprises one of a thermoplastic polyester elasto-mer (TPEE) film material, a thermoplastic polyurethane (TPU) film material, or a thermoplastic poly(ether-amide) elastomer (TPAE) film material.

Clause 18. The system for producing the patterned film according to any of clauses 13 through 17, wherein the run of carrier sheets is formed from one or more of a fibrous material and a woven composite material.

Clause 19. A method for producing a patterned film, the method comprising: continuously extruding a uniform thick-ness of a film material on to a first surface of a run of carrier sheets, each carrier sheet of the run of carrier sheets having a plurality of holes extending there through; rolling the run of carrier sheets with the film material deposited thereon around a central axis of rotation; and curing the film mate-rial.

Clause 20. The method for producing the patterned film according to clause 19, wherein the uniform thickness of the film material is from about 40 microns to about 200 microns.

Clause 21. The method for producing the patterned film according to any of clauses 19 through 20, wherein the film material comprises one of a thermoplastic polyester elasto-mer (TPEE) film material, a thermoplastic polyurethane (TPU) film material, or a thermoplastic poly(ether-amide) elastomer (TPAE) film material.

Clause 22. The method for producing the patterned film according to any of clauses 19 through 21, wherein the film material is cured from about 24 hours to about 36 hours.

Clause 23. A method for producing a film pattern on a substrate material, the method comprising: applying a sec-ond surface of a carrier sheet to the substrate material, the carrier sheet having a plurality of holes extending there through, a first surface of the carrier sheet having a uniform thickness of a film material deposited thereon; applying one or more of heat and pressure to the film material to cause the film material to transfer to the substrate material at areas corresponding to the plurality of holes in the carrier sheet; and removing the carrier sheet from the substrate material such that portions of the film material at areas not corre-sponding to the plurality of holes in the carrier sheet are also removed from the substrate material.

Clause 24. The method for producing the film pattern on the substrate material according to clause 23, wherein the carrier sheet is one or more of a fibrous material, a woven composite material, and a metal material.

Clause 25. The method for producing the film pattern on the substrate material according to any of clauses 23 through 24, wherein the substrate material includes one or more of a knit material, a woven material, and a non-woven material.

Clause 26. The method for producing the film pattern on the substrate material according to any of clauses 23 through 25, wherein the uniform thickness of the film material is from about 40 microns to about 200 microns.

Clause 27. The method for producing the film pattern on the substrate material according to any of clauses 23 through 26, wherein the film material comprises one of a thermo-plastic polyester elastomer (TPEE) film material, a thermo-plastic polyurethane (TPU) film material, or a thermoplastic poly(ether-amide) elastomer (TPAE) film material.

Clause 28. A carrier sheet assembly useable to apply a film pattern on a substrate material, the carrier sheet assem-bly comprising: a carrier sheet having a length and a width, the carrier sheet including a plurality of holes extending there through; and a film material adhered to a first surface of the carrier sheet, the film material having a uniform thickness, a length, and a width, wherein the length and the width of the film material is substantially the same as the length and the width of the carrier sheet, and wherein the film material extends continuously across the carrier sheet.

Clause 29. The carrier sheet assembly according to clause 28, wherein the uniform thickness of the film material is from about 40 microns to about 200 microns.

Clause 30. The carrier sheet assembly according to any of clauses 28 through 29, further comprising an adhesive secured to a second surface of the carrier sheet.

Clause 31. The carrier sheet assembly according to any of clauses 28 through 30, wherein the carrier sheet has a thickness from about 50 microns to about 500 microns.

Clause 32. The carrier sheet assembly according to any of clauses 28 through 31, wherein the carrier sheets includes one or more of a fibrous material and a woven composite material.

Clause 33. The carrier sheet assembly according to any of clauses 28 through 32, wherein the film material comprises one of a thermoplastic polyester elastomer (TPEE) film material, a thermoplastic polyurethane (TPU) film material, or a thermoplastic poly(ether-amide) elastomer (TPAE) film material.

Clause 34. A method for producing a film pattern on a substrate material, the method comprising: applying a sec-ond surface of a carrier sheet to the substrate material, the carrier sheet having a plurality of holes extending there through, applying a first surface of a film material to a first surface of the carrier sheet; applying one or more of heat and pressure to the film material to cause the film material to transfer to the substrate material at areas corresponding to the plurality of holes in the carrier sheet to produce a first pattern of discrete overlay film structures on the substrate material; and removing the carrier sheet from the substrate material such that portions of the film material at areas not corresponding to the plurality of holes in the carrier sheet are also removed from the substrate material.

Clause 35. The method for producing the film pattern on the substrate material according to clause 34, wherein the carrier sheet is one or more of a fibrous material, a nonwo-ven material, a woven composite material, and a metal material.

Clause 36. The method for producing the film pattern on the substrate material according to any of clauses 34 through 35, wherein the substrate material includes one or more of a knit material, a woven material, and a non-woven material.

Clause 37. The method for producing the film pattern on the substrate material according to any of clauses 34 through 36, wherein the film material has a thickness from about 40 microns to about 200 microns.

Clause 38. The method for producing the film pattern on the substrate material according to any of clauses 34 through 37, wherein the film material comprises one of a thermo-plastic polyester elastomer (TPEE) film material, a thermo-plastic polyurethane (TPU) film material, or a thermoplastic poly(ether-amide) elastomer (TPAE) film material.

Clause 39. The method for producing the film pattern on the substrate material according to any of clauses 34 through 38, further comprising: applying a release paper to a second surface of the film material prior to applying the one or more of heat and pressure to the film material, wherein the release paper has a non-uniform surface texture.

Clause 40. The method for producing the film pattern on the substrate material according to any of clauses 34 through 39, wherein the one or more of heat and pressure is applied to the film material for a first period of time, and wherein the one or more of heat and pressure is subsequently applied to the film material for a second period of time that is less than the first period of time.

Clause 41. The method for producing the film pattern on the substrate material according to clause 40, wherein the first period of time is about 30 seconds, and wherein the second period of time is about 10 seconds.

Clause 42. The method for producing the film pattern on the substrate material according to any of clauses 34 through 41, further comprising: subsequent to removing the carrier sheet from the substrate material, removing the film material from the carrier sheet; repositioning the carrier sheet on the substrate material such that the plurality of holes in the carrier sheet are offset from the pattern of discrete overlay film structures; re-applying the film material to the first surface of the carrier sheet such that the portions of the film material at areas not corresponding to the plurality of holes in the carrier sheet are positioned overtop the plurality of holes in the carrier sheet; applying one or more of heat and pressure to the film material to cause the film material to transfer to the substrate material at areas corresponding to the plurality of holes in the carrier sheet to produce a second pattern of discrete overlay film structures on the substrate material.

Clause 43. A jig comprising: a base surface having a first edge; a carrier sheet having a plurality of holes extending there through, the carrier sheet having a first edge that is movably fixed to the first edge of the base surface at an edge of fixation, wherein the jig is in an open state when the base surface and the carrier sheet are in a generally side-by-side relationship, and wherein the jig is in a closed state when the carrier sheet is positioned overtop the base surface via angular rotation around the edge of fixation.

Clause 44. A method for using the jig of clause 43: when the jig is in the open state, positioning a first edge of a substrate material such that it abuts the first edge of the base surface of the jig; transitioning the jig to the closed state via angular rotation around the edge of fixation; positioning a film material overtop the carrier sheet; and applying one or more of heat and pressure to the film material to cause the film material to transfer to the substrate material at areas corresponding to the plurality of holes in the carrier sheet to produce a pattern of discrete overlay film structures on the substrate material.

Clause 45. The method for using the jig according to clause 44, wherein the film material comprises one of a thermoplastic polyester elastomer (TPEE) film material, a thermoplastic polyurethane (TPU) film material, or a thermoplastic poly(ether-amide) elastomer (TPAE) film material.

Clause 46. The method for using the jig according to any of clauses 44 through 45, wherein the carrier sheet comprises a non-woven material, a fibrous material, a woven composite material, or a metal material.

Clause 47. The method for using the jig according to any of clauses 44 through 46, further comprising positioning a release paper overtop the film material prior to applying the one or more of heat and pressure to the film material.

Clause 48. The method for using the jig according to clause 47, wherein the release paper includes a non-uniform surface texture.

Clause 49. A method for using a transfer device comprising a base surface and a plurality of transfer points that extend away from a surface plane of the base surface, the method comprising: positioning a film material overtop a surface of a substrate material; positioning the transfer device overtop the film material such that the plurality of transfer points are in contact with the film material; and applying one or more of heat and pressure to the transfer device to cause the film material to transfer to the substrate material at areas corresponding to the plurality of transfer points to produce a pattern of discrete overlay film structures on the substrate material.

Clause 50. The method for using transfer device according to clause 49, wherein the film material comprises one of a thermoplastic polyester elastomer (TPEE) film material, a thermoplastic polyurethane (TPU) film material, or a thermoplastic poly(ether-amide) elastomer (TPAE) film material.

Clause 51. The method for using the transfer device according to any of clauses 49 through 50, further comprising positioning a release paper overtop the film material prior to positioning the transfer device overtop the film material.

Clause 52. The method for using the transfer device according to any of clauses 49 through 51, wherein the release paper includes a non-uniform surface texture.

Clause 53. The method for using the transfer device according to any of clauses 49 through 52, wherein the plurality of transfer points are formed of a material that conducts heat.

Clause 54. The method for using the transfer device according to any of clauses 49 through 53, wherein the plurality of transfer points are formed of a metal material.

Aspects of the present disclosure have been described with the intent to be illustrative rather than restrictive. Alternative aspects will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Not all steps listed in the various figures need be carried out in the specific order described.

What is claimed is:

1. A method for producing a patterned film, the method comprising:
   continuously extruding a uniform thickness of a film material on to a first surface of a run of carrier sheets, each carrier sheet of the run of carrier sheets having a plurality of holes extending there through, the film material extending across the plurality of holes of the carrier sheet and maintaining a uniform thickness as it extends across the plurality of holes, the plurality of holes configured to define the patterned film formed by transferring the film material to a substrate material through the plurality of holes;
   rolling the run of carrier sheets with the film material deposited thereon around a central axis of rotation; and
   curing the film material.

2. The method for producing the patterned film of claim 1, wherein the uniform thickness of the film material is from about 40 microns to about 200 microns.

3. The method for producing the patterned film of claim 1, wherein the film material comprises one of a thermoplastic polyester elastomer (TPEE) film material, a thermoplastic polyurethane (TPU) film material, or a thermoplastic poly(ether-amide) elastomer (TPAE) film material.

4. The method for producing the patterned film of claim 1, wherein the film material is cured from about 24 hours to about 36 hours.

5. The method for producing the patterned film of claim 1, wherein the run of carrier sheets is formed from one or more of a fibrous material, a nonwoven material, a woven composite material and a metal material.

6. The method for producing the patterned film of claim 1, wherein each of the carrier sheets comprises a second surface opposite the first surface, and the second surface of the carrier sheet includes an adhesive layer extending across the carrier sheet, wherein the adhesive layer extends across the plurality of holes.

7. The method for producing the patterned film of claim 1, wherein each of the carrier sheets has a thickness from about 50 microns to about 500 microns.

8. The method for producing the patterned film of claim 1, wherein each of the carrier sheets comprises a non-stick coating disposed between the film material and the carrier sheet.

9. The method for producing the patterned film of claim 8, wherein the non-stick coating comprises silicone or polytetrafluoroethylene.

10. The method for producing the patterned film of claim 8, wherein the curing step occurs prior to the rolling step.

11. The method for producing the patterned film of claim 1, wherein rolling the run of carrier sheets with the film material deposited thereon around a central axis of rotation forms a rolled good.

12. The method for producing the patterned film of claim 11, wherein the curing step occurs prior to the rolling step.

13. The method for producing the patterned film of claim 7, wherein the plurality of holes each have a diameter that is least 5 mm.

14. The method for producing the patterned film of claim 7, wherein the plurality of holes each have a minimum width of at least 5 mm and a minimum length of at least 5 mm.

* * * * *